(12) United States Patent
Saka et al.

(10) Patent No.: US 10,840,509 B2
(45) Date of Patent: Nov. 17, 2020

(54) POSITIVE ELECTRODE ACTIVE MATERIAL, AND LITHIUM SECONDARY BATTERY USING SAME

(71) Applicants: TOYOTA JIDOSHA KABUSHIKI KAISHA, Toyota (JP); SUMITOMO METAL MINING CO., LTD., Tokyo (JP)

(72) Inventors: Hideyuki Saka, Toyota (JP); Shuhei Oda, Niihama (JP); Tetsutaro Hayashi, Niihama (JP); Hiroyuki Toya, Niihama (JP)

(73) Assignees: TOYOTA JIDOSHA KABUSHIKI KAISHA, Toyota (JP); SUMITOMO METAL MINING CO., LTD., Tokyo (JP)

( * ) Notice: Subject to any disclaimer, the term of this patent is extended or adjusted under 35 U.S.C. 154(b) by 214 days.

(21) Appl. No.: 14/761,224

(22) PCT Filed: Jan. 22, 2014

(86) PCT No.: PCT/JP2014/051231
§ 371 (c)(1),
(2) Date: Jul. 15, 2015

(87) PCT Pub. No.: WO2014/115754
PCT Pub. Date: Jul. 31, 2014

(65) Prior Publication Data
US 2016/0006030 A1    Jan. 7, 2016

(30) Foreign Application Priority Data
Jan. 24, 2013   (JP) .................. 2013-011524

(51) Int. Cl.
*H01M 2/00*        (2006.01)
*H01M 4/505*       (2010.01)
(Continued)

(52) U.S. Cl.
CPC ........... *H01M 4/505* (2013.01); *H01M 4/131* (2013.01); *H01M 4/366* (2013.01); *H01M 4/525* (2013.01);
(Continued)

(58) Field of Classification Search
CPC ...... H01M 4/505; H01M 4/131; H01M 4/366; H01M 4/525; H01M 2/345; H01M 10/052;
(Continued)

(56) References Cited

U.S. PATENT DOCUMENTS

| | | | |
|---|---|---|---|
| 2002/0006550 A1 | 1/2002 | Yang et al. | |
| 2002/0037456 A1* | 3/2002 | Hosoya | H01M 4/382 429/231.3 |

(Continued)

FOREIGN PATENT DOCUMENTS

| | | |
|---|---|---|
| CN | 1307374 A | 8/2001 |
| CN | 101120464 A | 2/2008 |

(Continued)

OTHER PUBLICATIONS

Office Action dated Feb. 28, 2014, in U.S. Appl. No. 13/823,758, filed Mar. 15, 2013, 8 pages.

(Continued)

*Primary Examiner* — Jane J Rhee
(74) *Attorney, Agent, or Firm* — Sughrue Mion, PLLC

(57) ABSTRACT

A positive electrode active material for lithium secondary batteries disclosed herein comprises a lithium transition metal oxide of a layered structure, represented by formula $Li_{1+\alpha}Ni_xCo_yMn_zCa_\beta M_\gamma O_2$ (where $-0.05 \le \alpha \le 0.2$, $x+y+z+\beta+\gamma \cong 1$, $0.3 \le x \le 0.7$, $0.1 \le y \le 0.4$, $0.1 \le z \le 0.4$, $0.0002 \le \beta \le 0.0025$, $0.0002 \le \beta+\gamma \le 0.02$, and in a case where $\gamma > 0$, M is absent or represents one, two or more elements selected from the group consisting of Na, Mg, Al, Ti, V, Cr, Zr, Nb, Mo, Hf, (Continued)

Ta and W). The tap density of the positive electrode active material ranges from 1.8 to 2.5 g/cm$^3$.

5 Claims, 8 Drawing Sheets

(51) Int. Cl.
*H01M 4/525* (2010.01)
*H01M 4/131* (2010.01)
*H01M 4/36* (2006.01)
*H01M 10/052* (2010.01)
*H01M 10/42* (2006.01)
*H01M 4/02* (2006.01)
*H01M 2/34* (2006.01)

(52) U.S. Cl.
CPC .......... *H01M 2/345* (2013.01); *H01M 10/052* (2013.01); *H01M 10/4235* (2013.01); *H01M 2004/021* (2013.01); *H01M 2004/028* (2013.01); *H01M 2200/20* (2013.01)

(58) Field of Classification Search
CPC ....... H01M 10/4235; H01M 2004/021; H01M 2004/028; H01M 2200/20
See application file for complete search history.

(56) References Cited

U.S. PATENT DOCUMENTS

| | | | | |
|---|---|---|---|---|
| 2002/0122767 A1* | 9/2002 | Takahashi | .............. | B82Y 30/00 423/599 |
| 2003/0206852 A1 | 11/2003 | Yang et al. | | |
| 2005/0079416 A1* | 4/2005 | Ohzuku | ................ | H01M 4/485 429/231.1 |
| 2006/0093549 A1* | 5/2006 | Takahashi | .............. | C01G 51/42 423/594.6 |
| 2009/0035659 A1 | 2/2009 | Takeuchi et al. | | |
| 2009/0081547 A1* | 3/2009 | Nakura | ................ | H01M 4/131 429/219 |
| 2009/0081548 A1 | 3/2009 | Nakura | | |
| 2009/0117469 A1 | 5/2009 | Hiratsuka et al. | | |
| 2009/0181305 A1 | 7/2009 | Nagayama et al. | | |
| 2009/0233176 A1* | 9/2009 | Kita | ...................... | H01M 4/131 429/231.95 |
| 2010/0119881 A1* | 5/2010 | Patel | ...................... | H01M 2/34 429/7 |
| 2010/0151332 A1* | 6/2010 | Lopez | .................... | H01M 4/131 429/231.95 |
| 2011/0111288 A1* | 5/2011 | Nishida | ................. | C01B 25/455 429/199 |
| 2011/0183161 A1* | 7/2011 | Son | ......................... | H01M 2/34 429/7 |
| 2011/0244331 A1 | 10/2011 | Karthikeyan et al. | | |
| 2012/0074351 A1 | 3/2012 | Levasseur et al. | | |
| 2012/0141846 A1 | 6/2012 | Iwayasu et al. | | |
| 2012/0270107 A1 | 10/2012 | Toya et al. | | |
| 2013/0078520 A1* | 3/2013 | Toya | ....................... | C01G 53/00 429/223 |
| 2013/0209888 A1* | 8/2013 | Nagai | .................... | H01M 4/131 429/231.1 |
| 2014/0050976 A1 | 2/2014 | Nagai | | |

FOREIGN PATENT DOCUMENTS

| | | | |
|---|---|---|---|
| CN | 101809788 A | 8/2010 | |
| CN | 102386388 A | 3/2012 | |
| CN | 102823034 A | 12/2012 | |
| CN | 102884659 A | 1/2013 | |
| EP | 2 653 447 A1 | 10/2013 | |
| JP | 2003-267732 A | 9/2003 | |
| JP | 2006-310181 A | 11/2006 | |
| JP | 2006-351378 A | 12/2006 | |
| JP | 2006-351487 A | 12/2006 | |
| JP | 2007-027100 A | 2/2007 | |
| JP | 2008-053054 A | 3/2008 | |
| JP | 2011-116580 A | 6/2011 | |
| JP | WO 2012049779 A1 * | 4/2012 | ............ H01M 4/131 |
| JP | 2012-123955 A | 6/2012 | |
| JP | 2012-254889 A | 12/2012 | |
| JP | WO 2012169083 A1 * | 12/2012 | ............ C01G 53/00 |
| WO | 2012153379 A1 | 11/2012 | |

OTHER PUBLICATIONS

Office Action dated Jul. 23, 2014, in U.S. Appl. No. 13/823,758, filed Mar. 15, 2013, 7 pages.

* cited by examiner

POSITIVE ELECTRODE ACTIVE MATERIAL, AND LITHIUM SECONDARY BATTERY USING SAME

CROSS REFERENCE TO RELATED APPLICATIONS

This application is a National Stage of International Application No. PCT/JP2014/051231, filed Jan. 22, 2014, claiming priority based on Japanese Patent Application No. 2013-011524, filed Jan. 24, 2013, the contents of all of which are incorporated herein by reference in their entirety.

TECHNICAL FIELD

The present invention relates to a positive electrode active material for lithium secondary batteries. The present invention relates further to a lithium secondary battery obtained by using the positive electrode active material.

BACKGROUND ART

Lithium secondary batteries boast smaller size, lighter weight and higher energy density than existing batteries and exhibit improved input-output density. Accordingly, lithium secondary batteries are preferably used as so-called portable power sources in personal computers or mobile terminals, and as high-output power sources installed in vehicles.

Such lithium secondary batteries are generally used in a state where voltage is controlled so as to lie within a predefined region (for instance, 3.0 V to 4.2 V). However, the predefined voltage may in some instances be exceeded and an overcharge state be thus brought about, if more current than usual is supplied to the battery, for instance due to some malfunction. To cope with overcharge, therefore, batteries have been proposed that comprise a current interrupt device (hereafter, "CID") that interrupts current when the pressure inside a battery case becomes equal to or greater than a predetermined value. Generally, a nonaqueous solvent or the like comprised in an electrolyte solution undergoes electrolysis, and a gas is generated, when the battery enters an overcharge state. Upon detection of the gas, the CID cuts off the charging path of the battery, and further overcharge is prevented as a result. In order to activate the CID at a yet earlier stage of overcharge it is therefore necessary to raise promptly the pressure inside the battery case, for instance through generation of a large amount of gas.

As instances of prior art pertaining to this issue, for instance Patent Literature 1 discloses the feature of adding a polymerizable compound (or polymer) to a nonaqueous electrolyte solution, and adding a carbon dioxide generating agent to a positive electrode active material layer. By virtue of this feature, hydrogen ions are generated through reaction of the polymerizable compound in the electrolyte solution, during overcharge; thereupon, the hydrogen ions react with the carbon dioxide generating agent, so that carbon dioxide can be generated as a result. In Patent Literature 1 a CID can thus be activated promptly as a result.

CITATION LIST

Patent Literature

Patent Literature 1: Japanese Patent Application Publication No. 2012-123955
Patent Literature 2: Japanese Patent Application Publication No. 2003-267732
Patent Literature 3: Japanese Patent Application Publication No. 2011-116580

SUMMARY OF INVENTION

Approaches to increasing the energy density of lithium secondary batteries such as those used in, for instance, power sources for driving a vehicle, are being studied as one way of improving the performance of such batteries. Higher energy density can be realized, for instance, by adjusting the composition and properties (for instance, physical properties) of positive electrode active materials. Prior art citations that are relevant herein include, for instance, Patent Literature 2 and 3.

However, studies by the inventors have revealed that a concern of delayed activation of the CID, during overcharge, arises depending on, for instance, the properties of the positive electrode active material that is used. More specifically, a concern arose in that the contact surface area (specifically, reaction sites) between an electrode and an electrolyte solution might be reduced, and, as a result, generation of gas during overcharge be slowed down, due to, for instance, a reduction in the voids of the positive electrode active material layer in a case where the density of the positive electrode active material layer is increased through adjustment of the particle size of the positive electrode active material. A further concern arose in that gas might not be discharged smoothly from an electrode active material layer, due to narrowing diffusion paths of the generated gas.

In the light of the above considerations, it is an object of the present invention to provide a positive electrode active material for producing a positive electrode that allows achieving both excellent battery performance (for instance, high energy density) and high reliability during overcharge (overcharge resistance). A related object of the present invention is to provide a lithium secondary battery provided with a (pressure-activated type) current interrupt device that is activated as a result of a rise in battery internal pressure, such that the battery boasts both excellent battery performance and reliability during overcharge.

The present invention provides a positive electrode active material for lithium secondary batteries. The positive electrode active material for lithium secondary batteries disclosed herein comprises a lithium transition metal oxide (hereafter referred to as "LNCMC oxide") of a layered structure, represented by formula $Li_{1+\alpha}Ni_xCo_yMn_zCa_\beta M_\gamma O_2$. In the formula, $\alpha$, x, y, z, $\beta$ and $\gamma$ are $-0.05 \leq \alpha \leq 0.2$, $x+y+z+\beta+\gamma \cong 1$, $0.3 \leq x \leq 0.7$, $0.1 \leq y \leq 0.4$, $0.1 \leq z \leq 0.4$, $0.0002 \leq \beta \leq 0.0025$ and $0.0002 \leq \beta+\gamma \leq 0.02$. In a case where $\gamma > 0$, M is absent or represents one, two or more elements selected from among sodium (Na), magnesium (Mg), aluminum (Al), titanium (Ti), vanadium (V), chromium (Cr), zirconium (Zr), niobium (Nb), molybdenum (Mo), hafnium (Hf), tantalum (Ta) and tungsten (W). The tap density of the positive electrode active material disclosed herein ranges from 1.8 $g/cm^3$ to 2.5 $g/cm^3$.

A lithium transition metal oxide comprising Ni, Co and Mn as structural elements is excellent in thermal stability, and exhibits a higher theoretical energy density than those of other oxides. A high battery performance (for instance, energy density and cycle characteristic) can be realized as a result. Further incorporating Ca as a structural element allows generating quickly a large amount of gas during overcharge. In addition, discharge paths of the generated gas can be secured, such that gas generated during overcharge can be discharged quickly out of the electrode assembly, through adjustment of the tap density of the positive electrode active material so as to lie within the above range. As a result, the CID can be activated accurately at an early stage of overcharge.

Therefore, the positive electrode active material disclosed herein allows realizing both excellent battery performance (for instance, high energy density and cycle characteristic) and reliability during overcharge.

The tap density can be measured in accordance with the method specified in, for instance, JIS K1469 (2003), using an ordinary tapping-type density measuring device. In the present description, the term "lithium secondary battery" denotes generically a secondary battery in which lithium ions are used as charge carriers (electrolyte ions), such that charge and discharge are accomplished through traffic of lithium ions between a positive and a negative electrode.

In one preferred implementation disclosed herein, (a) an average particle size $D_{50}$ corresponding to a cumulative 50% from the fine particle side, ranges from 5 μm to 9 μm; (b) and a particle size $D_{10}$ corresponding to a cumulative 10% from the fine particle side, a particle size $D_{90}$ corresponding to a cumulative 90% from the fine particle side, and the average particle size $D_{50}$, satisfy the following relationship: $(D_{90}-D_{10})/D_{50} \leq 0.7$; in a volume-basis particle size distribution measured on the basis of a laser diffraction/light scattering method.

Suitable conductive paths can be formed between particles in a positive electrode active material that satisfies the above range of particle size. As a result, it becomes possible to reduce the resistance (for instance, charge transfer resistance) in the positive electrode active material layer, and to realize high battery performance. It becomes also possible to maintain proper voids within the positive electrode active material layer, and to elicit sufficient soaking by the nonaqueous electrolyte solution. The above relational expression provides an index that denotes the spread of the particle size distribution. The spread of the particle size distribution is narrowed, i.e. the positive electrode active material particles are made homogeneous, so that the above relational expression is 0.7 or smaller. As a result, the voltage that is applied to the particles is made homogeneous, and it becomes possible to suppress local degradation of the positive electrode active material accompanying charge and discharge. Excellent battery performance (for instance, energy density, input-output density, cycle characteristic) can be brought out during ordinary use, and a battery can be therefore suitably realized in which a CID can be activated through prompt generation of gas during overcharge.

In the present description, the term "average particle size" denotes a particle size (also referred to as $D_{50}$, median size) corresponding to a cumulative 50% from the fine particle side, in a volume-basis particle size distribution measured on the basis of a particle size distribution measurement according to an ordinary laser diffraction/light scattering method. Similarly to the above average particle size, the terms "$D_{10}$" and "$D_{90}$" denote respectively a cumulative 10% and a cumulative 90% from the fine particle side.

Preferably, the positive electrode active material is a hollow structure having a shell section made up of a lithium transition metal oxide of a layered structure, and a hollow section formed inside the shell section.

In the positive electrode active material of hollow structure, the diffusion distance of the lithium ions is short, and, accordingly, exchange of materials with the electrolyte solution (for instance, storage and release of lithium ions) can take place efficiently. Accordingly, a lithium secondary battery provided with such a positive electrode active material can exhibit a high input-output characteristic (in particular, high output density in a low SOC region, where ion diffusion into the active material is rate-limiting), and for instance a desired output can be achieved over a wide SOC range.

Studies by the inventors have revealed that gas generated during overcharge may in some instances fail to be discharged smoothly, out of the positive electrode active material layer, in cases where an ordinary positive electrode active material of hollow structure is used. The reactivity, during overcharge, of the positive electrode active material disclosed herein is however enhanced by comprising Ca as a structural element. Accordingly, the CID can be activated at an early stage through prompt generation of a large amount of gas, even when the positive electrode active material is set to have a structure (for instance, hollow structure) that is close to hollowness. That is, excellent battery performance (for instance, input-output density) and reliability during overcharge can both be achieved at a yet higher level.

In the positive electrode active material of hollow structure, preferably, the thickness of the shell section based on an electron microscope observation is 2 μm or smaller. A yet higher input-output characteristic can be realized by keeping small the thickness of the shell section and/or the primary particle size. Preferably, the thickness of the shell section based on an electron microscope observation is 0.1 μm or greater. Prescribing such a thickness allows securing higher durability against stress that is incurred during production or use of the battery, and against expansion and contraction of the positive electrode active material accompanying charge and discharge. Therefore, excellent performance can be realized stably, over long periods of time, in a battery that utilizes a positive electrode active material that satisfies the above thickness of shell section.

In the present description, the term "positive electrode active material of hollow structure" denotes a positive electrode active material wherein a proportion (particle porosity described below) taken up by a hollow section in an apparent cross-sectional area of the active material in a cross-section resulting from cutting the positive electrode active material at a random position, is 5% or higher. In the present description, the term "SOC" denotes the state of charge of the battery, taking as a reference the voltage range over which the battery is normally used. For instance, "SOC" refers to the state of charge taking as a reference a rated capacity measured under conditions of voltage across terminals (open circuit voltage (OCV)) of 4.1 V (upper limit voltage) to 3.0 V (lower limit voltage).

Preferably, such positive electrode active material particles have a through-hole that runs through the shell section (the hollow structure having a through-hole in the shell section is also referred to as "pierced hollow structure" thereafter). In a pierced positive electrode active material of hollow structure, the electrolyte solution seeps readily into the hollow section, and materials can be exchanged efficiently with the electrolyte solution in the hollow structure. Therefore, the output characteristic can be improved (in particular, output characteristic in a low SOC region), and desired output can be achieved over a wider SOC range. Accordingly, a battery provided with such a positive electrode active material allows achieving, at a higher level, both battery performance (for instance, input-output characteristic) and reliability during overcharge.

Preferably, a crystallite size r of the positive electrode active material, based on X-ray diffraction, ranges from 0.05 μm to 0.2 μm. By virtue of this feature, increases in resistance can be kept small, and it becomes possible to achieve, at a yet higher level, both battery performance (in particular, output characteristic) and reliability during overcharge.

The present invention provides a lithium secondary battery having a configuration wherein an electrode assembly comprising a positive electrode and a negative electrode, and a nonaqueous electrolyte solution, are accommodated within a battery case. The battery case comprises a current interrupt device that is activated when the internal pressure of the battery case rises. The positive electrode comprises any one of the positive electrode active materials disclosed herein. The lithium secondary battery disclosed herein affords high reliability during overcharge, while preserving good battery performance. For instance, the energy density and input-output density becomes higher, a desired output can be achieved over a wide SOC range, and the CID can be properly activated. By exploiting such features, the present invention can therefore be suitably used, for instance, as a power source (driving power source) of a vehicle.

DESCRIPTION OF EMBODIMENTS

Figure 1:
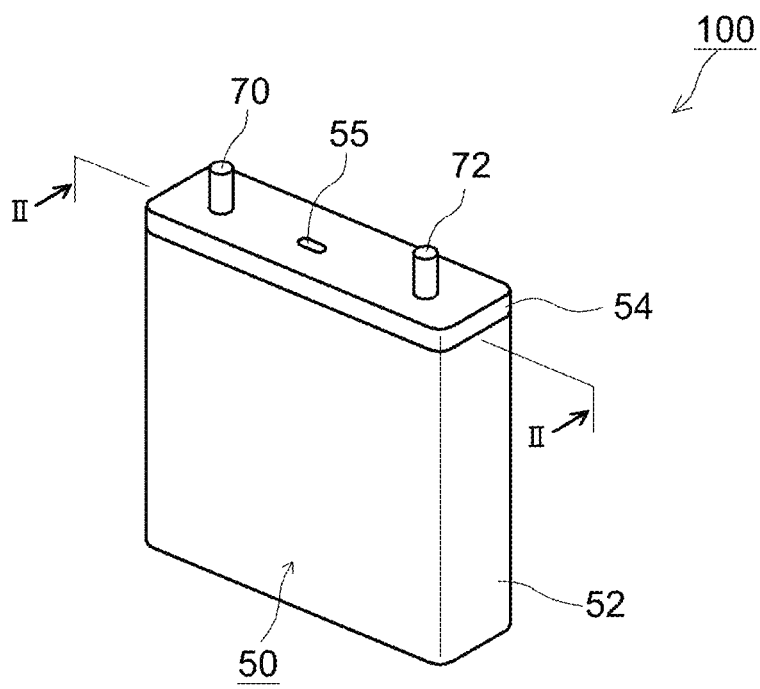
FIG. 1 is a perspective-view diagram illustrating schematically the outline of a lithium secondary battery according to one embodiment.

Preferred embodiments of the present invention will be explained next with reference to accompanying drawings. Any features other than the features specifically set forth in the present description (for instance, the composition or properties of the positive electrode active material) and which may be necessary for carrying out the present invention (for instance, a construction method of an ordinary battery) can be regarded as instances of design matter for a person skilled in the art on the basis of known techniques in the technical field in question. The present invention can be realized on the basis of the disclosure in the present description and on the basis of common technical knowledge in the technical field in question. In the drawings below, members and sites that elicit identical effects are denoted with identical reference numerals, and a recurrent explanation thereof will be omitted or simplified. Further, the dimensional relationships (length, width, thickness and so forth) do not necessarily reflect actual dimensional relationships.

<<Positive Electrode Active Material>>

Herein, the positive electrode active material (shell section of positive electrode active material particles in the positive electrode active material of hollow structure described below) comprises a lithium transition metal oxide having a layered crystal structure (typically a layered rock salt-type structure belonging to a hexagonal system) represented by formula $Li_{1+\alpha}Ni_xCo_yMn_zCa_\beta M_\gamma O_2$. Including Ca among the structural elements allows forming a compound of Li and Ca. According to studies by the inventors, forming such a compound allows suppressing polymerization of a nonaqueous electrolyte solution, and reducing the amount of alkalis (for instance, lithium hydroxide (LiOH)) at the positive electrode active material surface. As a result, it becomes possible to enhance reactivity of a gas generating agent during overcharge, and to generate quickly a greater amount of gas, as compared with an instance where, for example, the above compound is incorporated as an additive (gas generating agent) in the nonaqueous electrolyte solution.

The feature "comprising a lithium transition metal oxide" indicates that the positive electrode active material is substantially made up of the above oxide, while allowing for the presence of incidental impurities.

From the perspective of suppressing an increase in resistance, the above cc is a real number that satisfies $-0.05 \leq \alpha \leq 0.2$. Further, x, y, z, $\beta$ and $\gamma$ are real numbers that satisfy $x+y+z+\beta+\gamma \cong 1$ (typically, 0.95 to 1.02, for instance 1 to 1.02, and preferably 1). Herein, x, y and z are real numbers such that, typically, $0.98 \leq x+y+z \leq 0.9998$, where x is a real number that satisfies $0.3 \leq x \leq 0.7$, y is a real number that satisfies $0.1 \leq y \leq 0.4$, and z is a real number that satisfies $0.1 \leq z \leq 0.4$. In a preferred implementation, x and z are roughly similar (for instance, the difference between x and z is 0.1 or less), i.e. the amount of Ni and the amount of Mn are substantially similar (for instance, the difference between the amount of Ni and the amount of Mn is 10% or less). In another preferred implementation, x, y and z are roughly similar (for instance, differences among x, y and z are 0.1 or less), i.e. the amount of Ni, the amount of Co and the amount of Mn are roughly similar (for instance, differences between the Ni amount, Co amount and Mn amount are 10% or less). An LNCMC oxide of such composition exhibits excellent thermal stability and battery characteristics, and is accordingly preferable.

The above $\beta$ and $\gamma$ are the proportions of substitutional elements in the LNCMC oxide, and are real numbers that satisfy $0.0002 \leq \beta+\gamma \leq 0.02$, from the viewpoint of maintaining high energy density. Specifically, $\beta$ is a real number that satisfies $0.0002 \leq \beta \leq 0.0025$ (typically, $0.0005 \leq \beta \leq 0.002$, for instance $0.001 \leq \beta \leq 0.002$), and $\gamma$ is a real number that satisfies $0 \leq \gamma \leq 0.0198$. Preferably, the LNCMC oxide having such a composition exhibits excellent thermal stability and battery characteristics. In a case where $\gamma > 0$, M is one, two or more elements selected from among Na, Mg, Al, Ti, V, Cr, Zr, Nb, Mo, Hf, Ta and W.

In the present description, for convenience, the composition ratio of O (oxygen) is represented as 2 in the chemical formula that denotes a lithium transition metal oxide, but this numerical value is not to be interpreted in a strict manner, and a certain degree of composition fluctuation is allowable (typically, in the range from 1.95 to 2.05).

The tap density of the positive electrode active material disclosed herein is preferably 1.8 g/cm$^3$ or higher (preferably, 1.85 g/cm$^3$ or higher, and more preferably 1.88 g/cm$^3$ or higher). When the above ranges are satisfied, it becomes possible to increase the proportion of the positive electrode active material in the positive electrode active material layer, i.e. to increase the battery capacity (energy density) per unit volume. The tap density of the positive electrode active material is preferably 2.5 g/cm$^3$ or lower (preferably, 2.45 g/cm$^3$ or lower, more preferably 2.41 g/cm$^3$ or lower). When the above ranges are satisfied, it becomes possible to retain proper voids within the positive electrode active material layer; as a result, the active material layer is readily impregnated with an electrolyte solution, and the diffusion resistance of lithium ions within the positive electrode active material layer can be kept low. Storage and release of lithium ions can take place as a result more efficiently, and, in particular, the output characteristic can be enhanced (particularly the output characteristic in a low SOC region). In addition, gas generated during overcharge can be discharged quickly out of the electrode assembly, and the CID can be activated promptly.

The average particle size (secondary particle size) of the positive electrode active material may be, for instance 3 μm or greater, from the viewpoint of securing suitable voids within the positive electrode active material layer. In the positive electrode active material having the hollow structure described below, preferably, the average particle size is in particular 5 μm or greater (typically, 5.5 μm or greater). Studies by the inventors have revealed that when the average particle size is excessively small, the volume of the hollow section is likewise small, and, as a result, the effect of enhancing battery performance may in some instances be poor. In terms for instance of productivity, the average particle size is preferably about 10 μm or smaller, and more preferably, for instance, about 9 μm or smaller (typically, 8.5 μm or smaller). Good battery performance can be realized, yet more stably, when the above ranges are satisfied. The average particle size and the above-described tap density exhibit substantially a correlation relationship within the range of suitable average particle size disclosed herein. If there is no difference in starting materials or production methods, then a trend is ordinarily observed whereby the larger the average particle size, the higher the tap density is. Specifically, by prescribing the average particle size to lie thus in the above ranges it becomes possible to suitably realize a battery that allows combining, at a higher level, both battery performance (for instance, energy density and input-output density) and reliability during overcharge.

An index $(D_{90}-D_{10})/D_{50}$ that denotes the spread of the particle size distribution, and that is expressed using the average particle size $D_{50}$, a particle size $D_{10}$ corresponding to a cumulative 10% from the fine particle side, and a particle size $D_{90}$ corresponding to a cumulative 90% from the fine particle side, is preferably 0.7 or smaller (typically, 0.6 or smaller, for instance 0.55 or smaller, or preferably in the range 0.4 to 0.55). By setting a small spread of particle size distribution, namely 0.7 or smaller, i.e. by prescribing a uniform granularity of the positive electrode active material, it becomes possible to render more homogeneous the voltage that is applied to the positive electrode active material particles and to suppress local degradation of the positive electrode active material accompanying charge and discharge. Therefore, a high-durability battery can be realized that affords high battery performance (for instance, energy density) stably over long periods of time.

The lithium transition metal oxide disclosed herein has a layered crystal structure (typically, a layered rock salt-type structure belonging to a hexagonal system). The layers are laid along the (003) plane direction, and lithium ions are deemed to move, along spaces between the planes, through the interior of the positive electrode active material particles. Accordingly, a crystallite size r along the (003) plane direction of the positive electrode active material is preferably 0.05 μm or greater (typically, 0.06 μm or greater, for instance 0.08 μm or greater), and 0.2 μm or smaller (typically, 0.15 μm or smaller, for instance 0.11 μm or smaller). By virtue of that feature it becomes possible to keep resistance low in charge and discharge cycles, in particular at a high rate, and to maintain a high capacity. Therefore, both battery performance (in particular, output characteristic and energy density) and reliability during overcharge can be achieved at a yet higher level.

The crystallite size r can be calculated on the basis of a value of diffraction peaks (half width) obtained by X-ray diffraction measurements using CuKα rays, on the basis of Expression (1) below.

$$r=(0.9\times\lambda)/(\beta\times\cos\theta) \qquad \text{Expression (1)}$$

The meanings of r, λ, β and θ are as follows. The Bragg angle θ of the diffraction lines is set to lie in the range 17.9° to 19.9°, and the value of the half-width β at that θ is substituted in Expression (1)

r: crystallite size
λ: X-ray wavelength (CuKα)
β: spread (rad) of diffraction peak derived from the crystallite
θ: Bragg angle of the diffraction line.

In a preferred implementation, the positive electrode active material adopts the form of particles of hollow structure, having a shell section made up of a lithium transition metal oxide of a layered structure, and a hollow section (cavity) formed inside the shell. Typically, such particle shape is, for instance, a substantially spherical or somewhat distorted spherical shape. Examples of particles that are comparable to such particles of hollow structure include, for instance, ordinary particles of porous structure (solid structure). The term "porous structure" denotes herein a structure (sponge-like structure) in which a solid portion and void portions are mixed throughout the particle. In the positive electrode active material particles of hollow structure disclosed herein, the solid portion is localized towards the shell section, with a space being clearly formed in the hollow section. Further, the space taken up by the hollow section is larger than the gaps that yield secondary particles, and, accordingly, the positive electrode active material particles of hollow structure are clearly different, in structural terms, from positive electrode active material particles having a porous structure.

Such particles of hollow structure tend to collapse more readily, due for instance to stress load, than particles of solid structure. When for instance the hollow structure collapses due to stress load or the like, the voids in the positive electrode active material layer become fewer, and a concern arises in that gas generated during overcharge may fail to be discharged smoothly through the active material layer. The positive electrode active material disclosed herein, however, comprises Ca as a structural element, so that a large amount of gas can be promptly generated thereby during overcharge. Generation of a large amount of gas at an early stage of overcharge allows thus implementing a CID stably.

Figure 4:
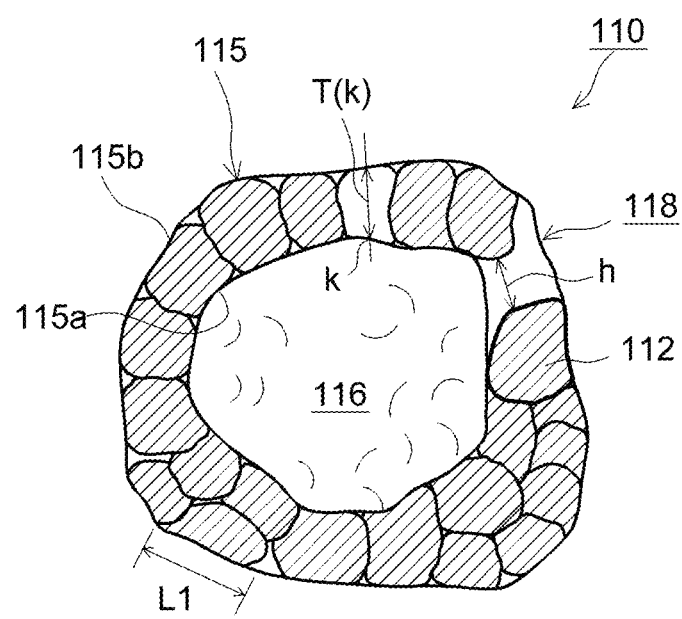
FIG. 4 is a diagram illustrating schematically a cross-sectional structure of a positive electrode active material according to one embodiment.

FIG. 4 illustrates schematically a representative structure of such positive electrode active material particles. Positive electrode active material particles 110 are particles of hollow structure, having a shell section 115 and a hollow section 116. The shell section 115 has a configuration resulting from aggregation of primary particles 112 into a spherical shell-like shape. In one preferred implementation, the cross-section of the shell section 115 exhibits a form wherein primary particles 112 are contiguous to each other (as multiple spheres), in an observation image obtained using an electron microscope (for instance, a scanning electron microscope (SEM). That ring-like section may adopt a form in which the primary particles 112 are contiguous to each other, in a single layer, over the entirety of the shell section 115, or a form having a portion in which the primary particles 112 are contiguously stacked on each other in two or more layers (multilayer). Preferably, the number of layers of the primary particles 112 at portions where the latter are contiguous to each other is about 5 or fewer (for instance, 2 to 5), and more preferably about 3 or fewer (for instance, 2 to 3). The positive electrode active material particles 110 according to one preferred implementation are configured to adopt a form wherein the primary particles 112 are contiguous to each other substantially in a single layer, in the entirety of the shell section 115.

The positive electrode active material particles (secondary particles) 110 having such a configuration exhibit less aggregation of the primary particles 112 than in the case of positive electrode active material particles that have a dense structure, with no cavities in the interior. As a result, the grain boundaries inside the particles are fewer in number (and accordingly the diffusion distance of lithium ions shorter), which makes for a higher diffusion rate of lithium ions into the particles. The output characteristic can therefore be effectively enhanced in a lithium secondary battery having such positive electrode active material particles 110 with few grain boundaries. For instance, a lithium secondary battery can be constructed that exhibits good output also in a low SOC region (for instance, SOC of 30% or less) for which ion diffusion into the active material is rate-limiting.

As used herein, the term "primary particles" denotes particles the geometry whereof can be considered to be outwardly that of unit particles (ultimate particles). In the positive electrode active material disclosed herein, the primary particles are typically aggregates of crystallites of a lithium transition metal oxide. The shape of the positive electrode active material can be observed, for instance, using a FE-SEM "Hitachi ultra-high resolution field-emission scanning microscope S5500" by Hitachi High-Technologies Corporation.

A major axis L1 of the primary particles 112 that make up the positive electrode active material particles 110 is 1 μm or smaller, and may range for instance from about 0.1 μm to 1 μm. Findings by the inventors have revealed that the cycle characteristic of the battery may tend to worsen when the major axis L1 of the primary particles 112 is excessively small. Such being the case, a positive electrode active material having a L1 of 0.2 μm or greater is preferable; more preferably, L1 is 0.3 μm or greater, and yet more preferably, 0.4 μm or greater. When L1 is excessively large, on the other hand, there increases the distance from the surface of the crystals up to the interior (central section of L1) (i.e., the diffusion distance of the lithium ions), and, accordingly, ion diffusion into the crystal slows down, and the output characteristic tends to drop (in particular, the output characteristic in a low SOC region). Given the above considerations, L1 is 1 μm or smaller, typically 0.8 μm or smaller, and preferably, for instance, 0.75 μm or smaller. In one preferred implementation, the major axis L1 of the primary particles ranges from 0.2 μm to 1 μm (for instance, from 0.3 μm to 0.8 μm). The major axis L1 of the primary particles 112 and the value of the crystallite size r described above exhibit roughly a correlation relationship. A trend is generally observed whereby the larger the major axis L1, the larger the crystallite size r is as well.

The major axis L1 of the primary particles 112 can be measured on the basis of observation images, by electron microscopy (for instance, SEM), of the particle surface of the positive electrode active material particles (secondary particles) 110. To measure the primary particle size of the positive electrode active material particles comprised in the positive electrode active material layer, it suffices to observe, under an electron microscope, the surface of the positive electrode active material particles that appear on a cross-section of the sliced active material layer. For instance, suitable primary particles 112 are identified, in such electron micrographs, in order to define the major axis L1. Specifically, a plurality of primary particles 112 is captured on an electron micrograph of the particle surface of the positive electrode active material particles (secondary particles) 110, and hence a plurality of the primary particles 112 is extracted in descending order of display surface area on the electron micrograph. As a result, it becomes possible to extract primary particles 112 the captured outline of which runs substantially along the longest major axis L1, on the electron micrograph of the particle surface. The longest longitudinal axis length of the extracted primary particles 112 may be set herein as the major axis L1.

The thickness of the shell section 115 (portion resulting from aggregation of primary particles into a spherical shell) in the positive electrode active material particles 110 is 2 μm or smaller, preferably 1.8 μm or smaller, and yet more preferably 1.5 μm or smaller. The smaller the thickness of the shell section 115, the more readily the lithium ions are released from the interior of the shell section 115 (central section in the thickness) during charging, and the more readily the lithium ions are absorbed into the shell section 115 during discharge. It becomes possible as a result to increase, under predetermined conditions, the amount of lithium ions per unit mass that can be stored in and released from the positive electrode active material particles, and to reduce resistance at those times where the positive electrode active material particles store or release lithium ions. A lithium secondary battery that utilizes such positive electrode active material particles 110 can exhibit therefore an excellent output characteristic.

The lower limit of the thickness of the shell section 115 is not particularly restricted, but, ordinarily, is preferably about 0.1 μm or greater. Prescribing the thickness of the shell section 115 to be 0.1 μm or greater allows securing higher durability against for instance stress that is incurred during production or use of the battery, and against expansion and contraction of the positive electrode active material accompanying charge and discharge. The performance of the lithium secondary battery can be stabilized thereby, while suitably securing moreover diffusion paths for the electrolyte solution and gas. Therefore, the thickness of the shell section 115 ranges preferably from about 0.1 μm to 2 μm, more preferably from 0.2 μm to 1.8 μm, and particularly preferably from 0.5 μm to 1.5 μm, in terms of combining, at a high level, an internal resistance lowering effect, durability, and reliability during overcharge.

The thickness of the shell section 115 denotes herein the average value of a shortest distance T(k) from any position k of an inner surface 115a (a portion corresponding to a through-hole 118 is not included in the inner surface 115a) of the shell section 115 up to an outer surface 115b of the shell section 115, in a cross-sectional electron micrograph of the positive electrode active material or a material that comprises the positive electrode active material particles 110. More specifically, the shortest distance T(k) is the arithmetic average value of values of shortest distance T(k) worked out for a plurality of positions at the inner surface 115a of the shell section 115. In this case, the thickness T of the shell section 115 converges to a average value, so that the thickness of the shell section 115 can be evaluated properly as a result, as there increases the number of points for which the shortest distance T(k) is worked out. Preferably, the thickness of the shell section 115 is worked out on the basis of, ordinarily, at least 10 (for instance, 20 or more) positive electrode active material particles 110. Preferably, the thickness of the shell section 115 is worked out on the basis of an electron micrograph of cross-sections for at least any 3 sites (for instance, 5 sites or more) of the positive electrode active material particles.

Preferably, the positive electrode active material particles 110 have the through-hole 118 that runs through the shell section 115 and that connects spatially thereby the hollow section 116 and the exterior (exterior of the particles 110). Thanks to the presence of the through-hole 118, the electrolyte solution can move readily into and out of the hollow section 116. The electrolyte solution inside the hollow section 116 can thus be appropriately replaced. As a result, dry-out due to shortage of electrolyte solution inside hollow section 116 becomes unlikelier, and the primary particles 112 that face the hollow section 116 can be utilized more actively in charge and discharge. In such a configuration, the thickness of the shell section 115 described above is 2 μm or less; as a result, lithium ions diffuse quickly into the crystals, while the electrolyte solution can be brought efficiently into contact with the primary particles 112. The output characteristic of the lithium secondary battery (in particular, output characteristic in a low SOC region) can be further enhanced thereby. Studies by the inventors have revealed that positive electrode active material particles having through-holes exhibit generally a tendency whereby gas generated during overcharge is not readily discharged smoothly out of the positive electrode active material layer. Thanks to the positive electrode active material disclosed herein, however, the CID can be activated at an early stage, also in such a structure, so that high reliability during overcharge can be thus realized.

Preferably, the number of through-holes 118 in the positive electrode active material particles 110 ranges from about 1 to about 10 (for instance, 1 to 5), as an average per particle of the positive electrode active material particle 110. The hollow structure may be difficult to preserve if the average number of through-holes is excessively large. Thanks to the positive electrode active material particles 110 having the preferred average number of through-holes disclosed herein, the battery performance-enhancing effect (for instance, output-enhancing effect) derived from having the pierced hollow structure can be elicited appropriately and stably, while securing the strength of the positive electrode active material particles 110.

An opening width h of the through-hole 118 may be of about 0.01 μm or greater, as an average value of a plurality of positive electrode active material particles. The opening width h of the through-hole 118 denotes herein the span length of the portion of through-hole 118 at which the path from the exterior of the positive electrode active material particle 110 to up to the hollow section 116 is narrowest. When the opening width of the through-hole 118 is equal to or greater than 0.01 μm in average, the through-hole 118 can be made to function more effectively as a flow passage of electrolyte solution. As a result, it becomes possible to bring out the effect of enhancing the battery performance of the lithium secondary battery more properly.

In a case where one positive electrode active material particle 110 has a plurality of through-holes 118, the opening width of the through-hole having the largest opening width, from among the plurality of through-holes 118, may be used as the opening width of the active material particles 110. The opening width h of the through-hole 118 is 2 μm or smaller in average, more preferably 1 μm or smaller in average, and yet more preferably 0.5 μm or smaller in average.

Characteristic values such as the average number of through-holes, average opening size and the like can be grasped for instance through observation of the cross-section of the positive electrode active material particles by electron microscopy. For instance, the positive electrode active material particles or a material comprising the active material particles may be embedded in an appropriate resin (preferably, a thermosetting resin), after which the sample is cut to an appropriate cross-section, and the resulting cut cross-section is observed by electron microscopy while being polished little by little. Alternatively, the above characteristic value can be calculated through statistical processing of the results of electron microscope observation of a single cross-section or of a comparatively small number of cross-sections, for instance about 2 to 10 cross-sections, since the orientation of the positive electrode active material particles in the sample can ordinarily be assumed to be substantially random.

In one preferred implementation, the shell section 115 is sintered densely at portions other than the through-hole 118 (typically, densely enough so as not to allow an ordinary electrolyte solutions to pass therethrough). By virtue of the positive electrode active material particles 110 having such a structure, the sites at which the electrolyte solution can flow between the exterior of the particles 110 and the hollow section 116 can be limited to a given number of through-holes 118. A particularly advantageous effect can be elicited as a result, for instance, in positive electrode active material particles that are used in batteries provided with a wound electrode assembly. Upon repeated charge and discharge in a battery provided with a wound electrode assembly, the electrolyte solution is squeezed out from the electrode assembly (in particular, positive electrode material layer) as a result of the expansion and contraction of the positive electrode active material particles accompanying charge and discharge; in consequence, the electrolyte solution becomes insufficient in part of the electrode assembly, and battery performance (for instance, the input-output characteristic) may drop. By virtue of the positive electrode active material particles 110 having the above configuration, the outflow of electrolyte solution from inside the hollow section 116 is blocked at portions other than the through-hole 118, and hence it becomes possible to effectively prevent, or reduce, shortage (dry-out) of electrolyte solution in the positive electrode active material layer. Such positive electrode active material particles have high shape retention (i.e. are not prone to collapsing, which can be reflected in that, for instance, the particles have high average hardness and high compressive strength). Therefore, good battery performance can be realized, yet more stably.

The positive electrode active material particles 110 have a hollow structure such that particle porosity is 5% or higher, and have preferably a hollow structure such that particle porosity is 10% or higher (for instance, 15% or higher). The advantages of the hollow structure may in some instances fail to be readily brought out, to a sufficient degree, when the particle porosity is excessively small. Particle porosity may be 20% or higher (typically 23% or higher, preferably 30% or higher). The upper limit of particle porosity is not particularly restricted, but, ordinarily, is suitably set to 95% or lower (typically 90% or lower, for instance 80% or lower), from the viewpoint of durability of the positive electrode active material particles (for instance, performance in terms of preserving a hollow structure against compressive stress or the like that may act on the particles during production or use of the battery). The hollow structure can be suitably maintained, and high input-output characteristics can be brought out in a sustained manner, by prescribing the above ranges.

Herein, the term "particle porosity" denotes the proportion of a hollow section within an apparent cross-sectional area of the positive electrode active material, in an average of cross-sections that are cut at random positions of the active material. This proportion can be grasped from observed images, by electron microscopy, of appropriate cross-sections of the positive electrode active material particles or the material comprising the positive electrode active material particles. Particle porosity can be grasped from electron micrographs of such cross-sections, similarly to the way in which the above average number of through-holes, average opening size and so forth are grasped. In the electron micrographs of the cross-sections, the shell section 115, the hollow section 116 and the through-hole 118 of the positive electrode active material particles can be distinguished from each other on the basis of differences in color tone or shading. Therefore, a ratio ($C_V/C_T$) is obtained between a surface area $C_V$ taken up by the hollow section 116 of the positive electrode active material particles 110 and the cross-sectional area $C_T$ apparently taken up by the positive electrode active material particles 110, for a plurality of positive electrode active material particles 110 depicted in an arbitrary cross-sectional observation image of the above sample. The cross-sectional area $C_T$ apparently taken up by the positive electrode active material particles denotes herein the cross-sectional area occupied by the shell section 115, the hollow section 116 and the through-hole 118 of the positive electrode active material particles. The proportion (i.e. particle porosity) taken up by the hollow section 116 within the apparent volume of the positive electrode active material particles can be worked out approximately on the basis of such ratio ($C_V/C_T$).

Preferably, there is calculated the arithmetic mean of values of the above ratio ($C_V/C_T$) for electron micrographs of a plurality of arbitrary cross-sections of the above sample. The arithmetic average value of the ratio ($C_V/C_T$) converges as there increases the number of cross-sectional observation images on the basis of which such ratio ($C_V/C_T$) is worked out, and thus the number of positive electrode active material particles that serve as a basis for calculating the ratio ($C_V/C_T$). Preferably, particle porosity is ordinarily worked out on the basis of at least 10 (for instance, 20 or more) positive electrode active material particles. Preferably, particle porosity is worked out on the basis of an observation image of at least 3 (for instance, 5 or more) arbitrary cross-sections of the sample.

The average hardness of the positive electrode active material particles 110 ranges preferably from about 0.5 MPa to 100 MPa. By comprising Ca as a structural element, the pierced positive electrode active material particles of hollow structure disclosed herein can be harder (have higher average hardness) and exhibit better shape stability than positive electrode active material particles of ordinary porous structure (solid structure). Positive electrode active material particles of hollow structure and high average hardness (in other words, high shape retention) allow thus realizing a battery that can deliver high performance more stably.

As used herein, the term "average hardness" denotes a value obtained as a result of a dynamic micro-hardness measurement performed under conditions of load rate 0.5 mN/sec to 3 mN/sec, using a flat diamond indenter having a diameter of 50 μm. For instance, a micro-hardness tester, model "MCT-W500" by Shimadzu Corporation, can be used for such dynamic micro-hardness measurement. The arithmetic average value of the hardness of the active material converges as the above hardness measurement is performed for a greater number of positive electrode active material particles. Preferably, an arithmetic average value based on at least 3 (preferably, 5 or more) positive electrode active material particles is used as the average hardness.

In a powder X-ray diffraction pattern, using CuKα rays, of the positive electrode active material particles 110, a ratio (A/B) of the half width A of a peak obtained from a diffraction plane of Miller indices (003) with respect to the half width B of a peak obtained from a diffraction plane of Miller indices (104) is preferably about 0.7 or lower (typically, lower than 0.7), more preferably 0.65 or lower, and yet more preferably 0.6 or lower (typically, lower than 0.6, for instance lower than 0.58). A lithium transition metal oxide exhibiting such a half width ratio (A/B) has wider surfaces that allow for intercalation of lithium ions, and shorter ion diffusion distances within crystals, than a lithium transition metal oxide that exhibits a larger half width ratio (A/B). Therefore, a positive electrode active material having such a configuration allows enhancing, yet more effectively, the output characteristic (in particular, output characteristic in a low SOC region) of the lithium secondary battery. The lower limit of the half width ratio (A/B) is not particularly restricted, but ordinarily the half width ratio (A/B) is preferably 0.35 or higher, (for instance, 0.4 or higher), in terms of ease of production. A concern may arise, in batteries provided with a positive electrode active material having an excessively low half width ratio (A/B), in that metal elements in the positive electrode active material may elute readily into the electrolyte solution, for instance during high-temperature storage. Elution of such metal elements may be one cause of battery capacity deterioration. From the viewpoint of the cycle characteristic at the time of high-temperature storage, accordingly, the half width ratio (A/B) of the positive electrode active material is suitably 0.4 or higher (for instance, 0.4<(A/B)), and preferably 0.5 or higher (for instance, 0.5<(A/B)). For example, a positive electrode active material that satisfies 0.4≤(A/B)<0.7 can be preferably used herein in terms of achieving a good balance between output characteristic and cycle characteristic. A positive electrode active material that satisfies 0.4<(A/B) ≤0.65 (and further 0.4<(A/B)<0.6, for instance 0.5≤(A/B) <0.6) allows achieving good results.

Positive electrode active material particles such as those described above can be produced in accordance with conventionally known production methods, for instance a method that involves precipitating, under appropriate conditions, a hydroxide of a transition metal comprised in the lithium transition metal oxide that makes up the positive electrode active material particles (generation of a starting material hydroxide), from an aqueous solution that comprises at least one of the transition metal elements (preferably, all the metal elements, other than lithium, comprised in the oxide), and firing thereupon a mixture of the transition metal hydroxide and a lithium compound.

In this case, generation of the starting material hydroxide may include a nucleation step of precipitating the transition metal hydroxide from an aqueous solution, under conditions of pH of 12 or higher and ammonium ion concentration of 25 g/L or lower; and a particle growth step of growing the precipitated transition metal hydroxide, under conditions of pH lower than 12 and ammonium ion concentration of 3 g/L or higher. Firing may be carried out such that the highest firing temperature ranges from 800° C. to 1100° C. Such a production method allows suitably producing positive electrode active material particles having the pierced hollow structure disclosed herein.

<<Lithium Secondary Battery>>

The present invention provides a lithium secondary battery having a configuration wherein an electrode assembly comprising a positive electrode and a negative electrode, and a nonaqueous electrolyte solution, are accommodated within a battery case. The positive electrode comprises the positive electrode active material disclosed herein (i.e. a layered lithium transition metal oxide). The battery case comprises a current interrupt device that is activated when the internal pressure of the battery case rises.

Although not meant to be particularly limiting in any way, an example of a lithium secondary battery of a form wherein a flat-wound electrode assembly (wound electrode assembly) and a nonaqueous electrolyte solution are accommodated in a flat parallelepiped-shaped (box-shaped) container, will be explained in detail herein as a lithium secondary battery according to one embodiment of the present invention.

Figure 2:
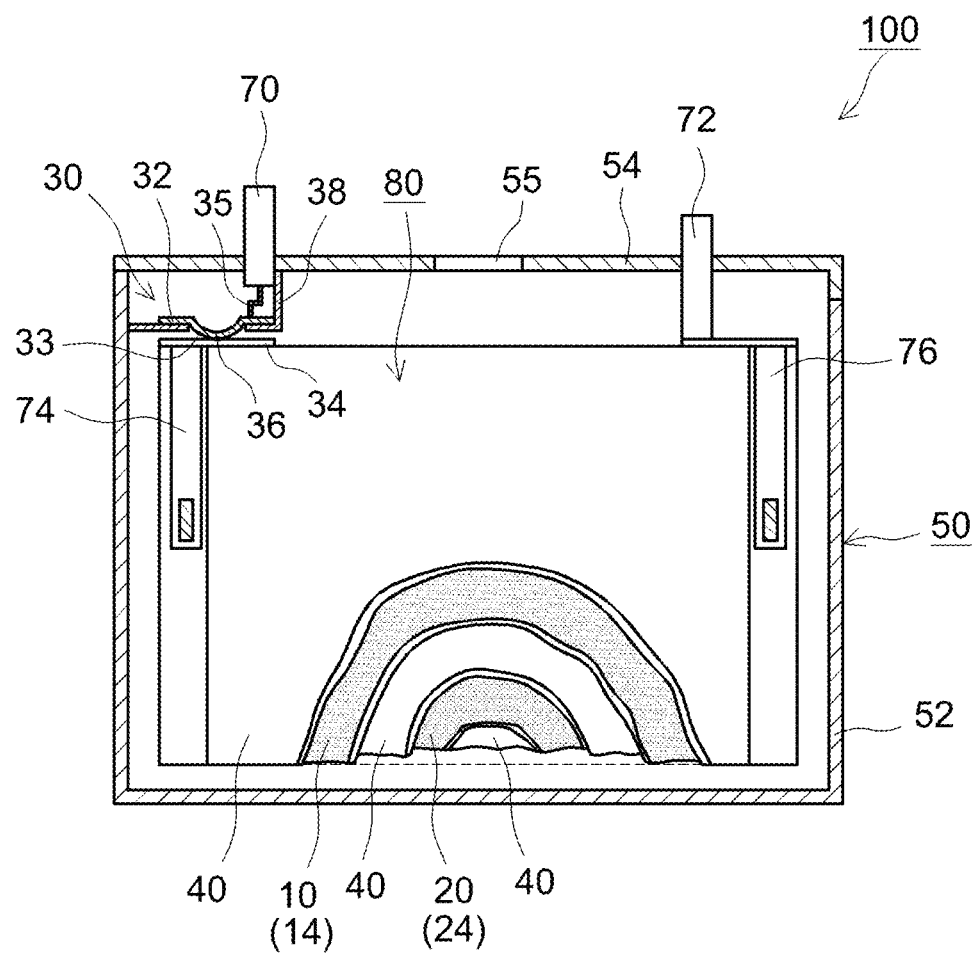
FIG. 2 is a diagram illustrating schematically a cross-sectional structure of FIG. 1 along line II-II.

The lithium secondary battery according to one embodiment of the technology disclosed herein has a configuration wherein, for instance as illustrated in FIG. 1 and FIG. 2, a wound electrode assembly 80 is accommodated, together with a nonaqueous electrolyte solution, not shown, in a flat battery case 50 of flat parallelepiped (square) shape corresponding to the shape of the wound electrode assembly 80. The battery case 50 comprises a battery case main body 52 having a flat parallelepiped shape (square shape) opened at the top end, and a lid body 54 that plugs the opening of the battery case main body 52. A positive electrode terminal 70 and a negative electrode terminal 72 for external connection are provided at the top face of the battery case 50 (i.e. the lid body 54), such that part of these terminal juts out of the battery through the lid body 54. A safety valve 55 for discharging to the exterior gas that is generated inside the battery case is provided in the lid body 54.

A lithium secondary battery 100 having such a configuration can be constructed, for instance, by accommodating the wound electrode assembly 80 into the battery case 50, through the opening of the latter, attaching the lid body 54 to the opening of the battery case 50, and thereafter, injecting a nonaqueous electrolyte solution through an electrolyte solution injection hole, not shown, that is provided in the lid body 54, followed by plugging of the injection hole for instance by welding or the like. The sealing process of the battery case 50 and the arrangement (injection) process of the electrolyte solution can be accomplished in accordance with methods identical to those of resorted to in the production of conventional lithium secondary batteries.

As illustrated in FIG. 2, an electrode assembly (wound electrode assembly) 80 of a form resulting from flat winding of an elongate positive electrode sheet 10 and an elongate negative electrode sheet 20, across an interposed an elongate separator sheet 40, is accommodated, together with a nonaqueous electrolyte solution not shown, inside the battery case 50. A positive electrode collector plate 74 and a negative electrode collector plate 76 are respectively attached to an end of the positive electrode sheet 10 (i.e. at a non-formation portion of the positive electrode active material layer 14) and an end of the negative electrode sheet 20 (i.e. at a non-formation portion of the negative electrode active material layer 24). The positive electrode collector plate 74 and the negative electrode collector plate 76 are electrically connected to above-described positive electrode terminal 70 and negative electrode terminal 72.

A current interrupt device 30 that is activated through a rise in the internal pressure of the battery case 50 is provided inside the latter. The current interrupt device 30 is not limited to any specific shape, and it suffices that current interrupt device 30 be configured so that a conductive path (for instance, a charging path) from at least one of the electrode terminals up to the wound electrode assembly 80 is cut off when the internal pressure of the battery case 50 rises. In the embodiment illustrated in FIG. 2, the current interrupt device 30, which is provided between the wound electrode assembly 80 and the positive electrode terminal 70 that is fixed to the lid body 54, is configured so that a conductive path from the positive electrode terminal 70 to the wound electrode assembly 80 is cut off in a case where the internal pressure of the battery case 50 rises. More specifically, the current interrupt device 30 may comprise, for instance, a first member 32 and a second member 34. The current interrupt device 30 is configured so that at least one from among the first member 32 and the second member 34 deforms and moves away from the other member, so that the conductive path is cut off as a result, in a case where the internal pressure of the battery case 50 rises. In the present embodiment, the first member 32 is a deforming metal plate and the second member 34 is a connecting metal plate that is joined to the deforming metal plate 32. The deforming metal plate (first member) 32 has, at the central portion thereof, a downward-curving arch shape, with a peripheral edge portion thereof being connected to the lower face of the positive electrode terminal 70 via a collecting lead terminal 35. The leading end of a curved portion 33 of the deforming metal plate 32 is joined to the top face of the connecting metal plate 34. The lower face (rear face) of the connecting metal plate 34 is joined to the positive electrode collector plate 74, which is in turn connected to the positive electrode sheet 10 of the electrode assembly 80. A conductive path becomes formed thus from the positive electrode terminal 70 to the wound electrode assembly 80.

The current interrupt device 30 comprises an insulating case 38 formed of plastic or the like. The insulating case 38, which is provided so as to surround the deforming metal plate 32, hermetically seals the top face of the latter. The internal pressure of the battery case 50 does not act on the top face of the hermetically sealed curved portion 33. The insulating case 38 has an opening through which the curved portion 33 of the deforming metal plate 32 is inserted. The lower face of the curved portion 33 is exposed to the interior of the battery case 50 through this opening. The internal pressure of the battery case 50 acts on the lower face of the curved portion 33 that is exposed to the interior of the battery case 50. When the internal pressure of the battery case 50 rises, the internal pressure acts on the lower face of the curved portion 33 of the deforming metal plate 32 of the current interrupt device 30 thus configured, whereupon the curved portion 33 that is curved downward is pushed up. The upward push of the curved portion 33 increases as the internal pressure of the battery case 50 rises. When the internal pressure of the battery case 50 exceeds a set pressure, the curved portion 33 flips vertically and deforms so as to curve upward. A junction 36 between the deforming metal plate 32 and the connecting metal plate 34 becomes cut off as a result of the deformation of the curved portion 33. The conductive path from the positive electrode terminal 70 to the electrode assembly 80 becomes cut off as a result, and the overcharge current is interrupted.

The current interrupt device 30 is not limited to being provided on the positive electrode terminal 70 side, and may be provided on the negative electrode terminal 72 side. The current interrupt device 30 is not limited to mechanical cut-off upon deformation of the above-described deforming metal plate 32, and, for instance, an external circuit can be provided, as the current interrupt device, such that the charging current is cut off when the internal pressure of the battery case 50, as detected by a sensor, exceeds a set pressure.

Figure 3:
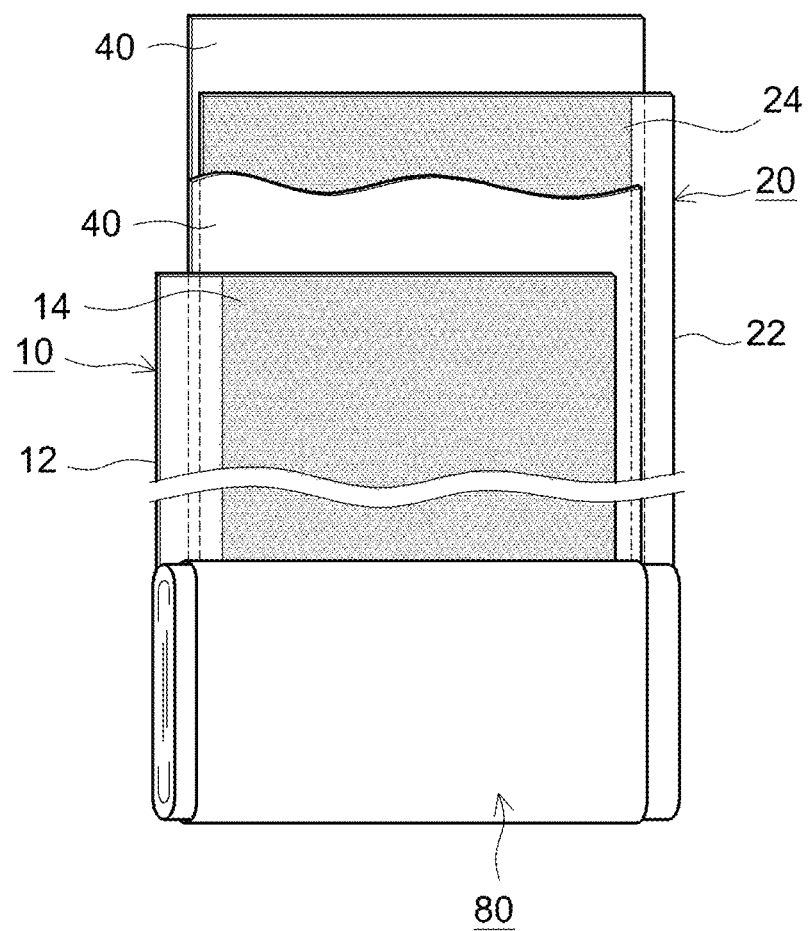
FIG. 3 is a schematic diagram illustrating the configuration of a wound electrode assembly of FIG. 2.

FIG. 3 is a diagram illustrating schematically an elongate sheet structure (electrode sheet) at a stage prior to assembling the wound electrode assembly 80. In the wound positive electrode sheet 10, the positive electrode active material layer 14 is formed along the longitudinal direction, on one or both faces (typically, both faces) of the elongate positive electrode collector 12, such that the positive electrode active material layer 14 is not provided (or is removed) and the positive electrode collector 12 is exposed, at a first edge section along the longitudinal direction of the positive electrode sheet 10. Similarly, the wound negative electrode sheet 20 is formed along the longitudinal direction, on one or both faces (typically, both faces) of the elongate negative electrode collector 22, such that the negative electrode active material layer 24 is not provided (or is removed) and the negative electrode collector 22 is exposed, at a first edge section along the longitudinal direction of the negative electrode sheet 20. A wound electrode assembly can be produced then by stacking the positive electrode sheet 10 and the negative electrode sheet 20, together with the elongate separator sheet 40, and winding then the resulting stack in the longitudinal direction. The positive electrode sheet 10 and the negative electrode sheet 20 are superposed slightly offset from each other, in the width direction, in such a manner that a positive electrode active material layer non-formation portion of the positive electrode sheet 10 and a negative electrode active material layer non-formation portion of the negative electrode sheet 20 just beyond both respective sides of the separator sheet 40, in the width direction. The resulting wound electrode assembly is squashed from the sides, to yield thereby a flat wound electrode assembly 80.

<Positive Electrode Sheet 10>

The positive electrode sheet 10 of the lithium secondary battery disclosed herein is provided with the positive electrode collector 12, and the positive electrode active material layer 14 comprising at least a positive electrode active material and being formed on the positive electrode collector. The positive electrode active material layer 14 comprises any one of the positive electrode active materials disclosed herein, and, as needed, for instance a conductive material such that the foregoing are fixed to the positive electrode collector 12.

Such a positive electrode sheet 10 can be preferably produced by applying (typically, by coating) a paste-like or slurry-like composition (dispersion for forming a positive electrode active material layer) resulting from dispersing a positive electrode active material, and for instance a conductive material, a binder and so forth that are used as needed, in an appropriate solvent, onto the positive electrode collector 12, followed by drying. Materials already described above can be appropriately selected and used as the positive electrode active material. The solvent that can be used may be an aqueous solvent or an organic solvent. For instance, N-methyl-2-pyrrolidone (NMP) can be used herein.

A conductive member comprising a metal of good conductivity (for instance, aluminum, nickel, titanium, stainless steel or the like) can be suitably used in the positive electrode collector 12. The collector may adopt various shapes, in accordance with, for instance, the shape of the battery that is constructed, and is therefore not particularly limited. The collector may be, for instance, a rod-like body, plate-like body, a foil-like body or a mesh-like body. A foil-like body is mainly resorted to in batteries that are provided with a wound electrode assembly. The thickness of the foil-like collector is not particularly limited, and may be set to range from about 5 µm to 50 µm (more preferably, from 8 µm to 30 µm), in terms of a trade-off between capacity density of the battery and collector strength.

A carbon material can be typically used as the conductive material. Specific examples thereof include, for instance, one, two or more types selected from among carbon materials such as carbon black (for instance, acetylene black, Ketjen black), coke, activated carbon, graphite (natural graphite, synthetic graphite) and carbon fibers (PAN-based carbon fibers, pitch-based carbon fibers), carbon nanotubes, fullerenes, graphene and the like. Carbon black (typically, acetylene black) can be appropriately used among the foregoing.

As the binder there can be used a polymer that can dissolve or disperse in the solvent that is used. In compositions that utilize a nonaqueous solvent, for instance polyvinylidene fluoride (PVdF), polyvinylidene chloride (PVdC) or the like can be preferably used. In compositions that utilize an aqueous solvent there can be preferably used a cellulosic polymer, for instance carboxymethyl cellulose (CMC; typically a sodium salt thereof), hydroxypropyl methyl cellulose (HPMC) or the like; polyvinyl alcohol (PVA); a fluororesin such as polytetrafluoroethylene (PTFE) or the like; or a rubber such as styrene butadiene rubber (SBR) or the like.

The proportion of the positive electrode active material in the positive electrode active material layer 14 as a whole is, appropriately, about 50% by mass or higher (typically, in the range 50% by mass to 95% by mass); preferably, the proportion ranges ordinarily from about 70% by mass to 95% by mass. In a case where a conductive material is used, the proportion of the conductive material in the positive electrode active material layer 14 as a whole can be set to range, for instance, from about 2% by mass to 20% by mass; preferably, the proportion is set to range ordinarily from about 2% by mass to 15% by mass. In a case where a binder is used, the proportion of the binder in the positive electrode active material layer 14 as a whole can be set to range, for instance, from about 0.5% by mass to 10% by mass; preferably, the proportion is set to range ordinarily from about 1% by mass to 5% by mass.

The mass of the positive electrode active material layer 14 that is provided per unit surface area of the positive electrode collector 12 (total mass on both faces in a configuration with the positive electrode active material layer 14 on both faces of the positive electrode collector 12) is appropriately set to range, for instance, from about 5 mg/cm$^2$ to 40 mg/cm$^2$ (typically, from about 10 mg/cm$^2$ to 20 mg/cm$^2$). The density of the positive electrode active material layer 14 may be set to range, for instance, from about 1.5 g/cm$^3$ to 4 g/cm$^3$ (typically, from about 1.8 g/cm$^3$ to 3 g/cm$^3$). Suitable conductive paths can be formed in the positive electrode active material by prescribing the density of the positive electrode active material layer 14 to lie in the above ranges. As a result, the resistance of the positive electrode active material layer 14 can be reduced, which allows realizing high battery performance. It becomes also possible to maintain proper voids within the positive electrode active material layer 14, and to elicit sufficient impregnation by the electrolyte solution. As a result, excellent battery performance (for instance, energy density and input-output density) can be brought out during ordinary use, and a battery can be suitably realized that allows activating the CID through prompt generation of gas during overcharge.

<Negative Electrode Sheet 20>

The negative electrode sheet 20 of the lithium secondary battery disclosed herein is provided with the negative electrode collector 22, and the negative electrode active material layer 24 comprising at least a negative electrode active material and formed on the negative electrode collector. The negative electrode active material layer 24 comprises at least a negative electrode active material, and is fixed to the negative electrode collector 22. Such a negative electrode sheet 20 can be produced more preferably by applying (typically, by coating) a paste-like or slurry-like composition (dispersion for forming a negative electrode active material layer) resulting from dispersing, in an appropriate solvent, a negative electrode active material and for instance a binder and so forth used as needed, onto the negative electrode collector 22, followed by drying. A conductive material comprising a metal of good conductivity (for instance, copper, nickel, titanium, stainless steel or the like) is used preferably as the negative electrode collector 22. The shape of the negative electrode collector 22 may be identical to the shape of the positive electrode collector. The solvent that can be used may be an aqueous solvent or an organic solvent. For instance, water can be used herein.

One, two or more types of known materials that can be used as negative electrode active materials of lithium secondary batteries can likewise be utilized herein, without particular limitations, as the negative electrode active material. Herein there can be used, although not particularly limited thereto, for instance a carbon material such as natural graphite (black lead), synthetic graphite, hard carbon (hardly graphitizable carbon), soft carbon (easily graphitizable carbon), carbon black or the like; metal oxide materials such as silicon oxide, titanium oxide, vanadium oxide, iron oxide, cobalt oxide, nickel oxide, niobium oxide, tin oxide, lithium silicon complex oxides, lithium titanium complex oxides (lithium titanium composite oxide: LTO, for instance $Li_4Ti_5O_{12}$, $LiTi_2O_4$ or $Li_2Ti_3O_7$), lithium vanadium complex oxides, lithium manganese complex oxides, lithium tin complex oxides and the like; metal nitride materials such as lithium nitride, lithium cobalt complex nitrides, lithium nickel complex nitrides and the like; or metallic material comprising metals such as tin, silicon, aluminum, zinc, lithium or the like, or metal alloys having the foregoing metal elements as main constituents.

As the binder there can be used an appropriate binder from among the polymer materials having been exemplified as binders of the positive electrode active material layer above. Specific examples include, for instance, styrene butadiene rubber (SBR), polyvinylidene fluoride (PVdF), polytetrafluoroethylene (PTFE) and the like. Besides the binder, various additives such as dispersants, conductive materials and the like can be used as appropriate.

The proportion of the negative electrode active material in the negative electrode active material layer 24 as a whole is appropriately set to about 50% by mass or higher, and preferably to range from 90% by mass to 99% by mass (for instance, 95% by mass to 99% by mass). In a case where a binder is used, the proportion of the conductive material in the negative electrode active material layer 24 as a whole can be set to range, for instance, from about 1% by mass to 10% by mass; preferably, the proportion is set to range ordinarily from about 1% by mass to 5% by mass.

The mass of the negative electrode active material layer 24 that is provided per unit surface area of the negative electrode collector 22 (total mass on both faces of the negative electrode collector 22 in a case of structure having the negative electrode active material layer 24 on both faces of the negative electrode collector 22) is appropriately set to range, for instance, from about 5 $mg/cm^2$ to 20 $mg/cm^2$ (typically, from about 5 $mg/cm^2$ to 10 $mg/cm^2$). The density of the negative electrode active material layer 24 may be set to range, for instance, from about 0.5 $g/cm^3$ to 2 $g/cm^3$ (typically, from about 1 $g/cm^3$ to 1.5 $g/cm^3$). Diffusion resistance of lithium ions can be kept low, while maintaining a desired capacity, by prescribing the density of the negative electrode active material layer 24 to lie in the above ranges. As a result, it becomes possible to realize yet higher battery performance (for instance, output characteristic and energy density).

<Separator 40>

Separators identical to separators for ordinary lithium secondary batteries can be used herein, without particular limitations, as the separator 40. For instance, there can be used porous sheets, nonwoven fabrics or the like made up of a resin such as polyethylene (PE), polypropylene (PP), polyester, cellulose, polyamide or the like. Suitable examples thereof include porous sheets (micro-porous resin sheets) having a single-layer or multilayer structure the main constituent whereof is one, two or more types of polyolefin resin. Sheets that can be appropriately used herein include PE sheets, PP sheets, and sheets having a three-layer structure (PP/PE/PP structure) in which a PP layer is overlaid on both sides of a PE layer. A porous heat-resistant layer may be provided on one or both faces (typically, one face) of the above porous sheet. The porous heat-resistant layer can comprise for instance an inorganic material (an inorganic filler such as alumina particles or the like can be preferably used herein) and a binder. Alternatively, the porous heat-resistant layer may comprise insulating resin particles (for instance, particles of polyethylene, polypropylene or the like).

<Battery Case 50>

Examples of the material of the battery case 50 include metallic materials such as aluminum, steel or the like, and resin materials such as polyphenylene sulfide resins, polyimide resins and the like. A comparatively lightweight metal (for instance, aluminum or aluminum alloy) can be preferably used among the foregoing in terms of enhancing heat dissipation and increasing energy density. The shape (container outline) of the battery case 50 is not particularly limited, and may be, for instance, a circular shape (cylindrical shape, coin shape, button shape), a hexahedral shape (rectangular parallelepiped (prismatic shape), cubic shape) or a bag-body shape, or a shape resulting from working or deforming the foregoing.

<Nonaqueous Electrolyte Solution>

As the nonaqueous electrolyte solution there can be preferably used a nonaqueous electrolyte solution resulting from dissolving or dispersing a supporting salt (a lithium salt in lithium secondary batteries) in a nonaqueous solvent. A salt similar to that of ordinary lithium secondary batteries can be used as appropriate as the supporting salt. For instance, a lithium salt such as $LiPF_6$, $LiBF_4$, $LiClO_4$, $LiAsF_6$, $Li(CF_3SO_2)_2N$, $LiCF_3SO_3$ or the like can be used as the lithium salt. Such a supporting salt can be used singly or in combinations of two or more types. In particular, $LiPF_6$ is a preferred example of the supporting salt. Preferably, the nonaqueous electrolyte solution is prepared in such a manner that the concentration of the supporting salt lies in the range 0.7 mol/L to 1.3 mol/L.

One, two or more types of organic solvent used in ordinary lithium secondary batteries can be selected and used, as appropriate, as the above nonaqueous solvent. Examples of particularly preferred nonaqueous solvents include, for instance, ethylene carbonate (EC), diethyl carbonate (DEC), dimethyl carbonate (DMC), ethyl methyl carbonate (EMC), vinylene carbonate (VC), propylene carbonate (PC) and the like. For instance, a mixed solvent comprising EC, DMC and EMC at a volume ratio 3:4:3 can be appropriately used herein.

In one preferred implementation, the nonaqueous electrolyte solution comprises an additive (gas generating agent) that can generate a gas by decomposing when a predetermined battery voltage is exceeded. As the gas generating agent there can be used, without any particular limitations, one, two or more compounds selected from among compounds that are used in similar applications, so long as the compound can generate a gas by decomposing when a predetermined battery voltage is exceeded (specifically, compounds the oxidation potential whereof (vs. Li/Li$^+$) is equal to or greater than the charging upper limit potential of the positive electrode, such that the compound can generate a gas by decomposing when that potential is exceeded and an overcharge state is accordingly brought about). Specific examples of the gas generating agent include, for instance, aromatic compounds such as biphenyl compounds, alkylbiphenyl compounds, cycloalkylbenzene compounds, alkylbenzene compounds, organophosphorus compounds, fluorine atom-substituted aromatic compounds, carbonate compounds, cyclic carbamate compounds, alicyclic hydrocarbons and the like.

More specific compounds include, for instance, biphenyl, cyclohexylbenzene, 1-fluoro-2-cyclohexylbenzene, 1-fluoro-3-cyclohexylbenzene, 1-fluoro-4-cyclohexylbenzene, 1-bromo-4-cyclohexylbenzene, trans-butylcyclohexylbenzene, cyclopentylbenzene, tert-butylbenzene, tert-pentylbenzene, 1-fluoro-4-tert-butylbenzene, 1-chloro-4-tert-butylbenzene, 1-bromo-4-tert-butylbenzene, tert-pentylbenzene, 1-fluoro-4-tert-pentylbenzene, 1-chloro-4-tert-pentylbenzene, 1-bromo-4-tert-pentylbenzene, tert-aminobenzene, terphenyl, 2-fluorobiphenyl, 3-fluorobiphenyl, 4-fluorobiphenyl, 4,4'-difluorobiphenyl, o-cyclohexylfluorobenzene, p-cyclohexylfluorobenzene, tris-(t-butylphenyl)phosphate, phenyl fluoride, 4-fluorophenyl acetate, diphenyl carbonate, methylphenyl carbonate, bis-tert-butylphenyl carbonate, diphenyl ether, dibenzofuran and the like.

For instance, biphenyl (BP) or cyclohexylbenzene (CHB) can be preferably used in batteries where the charging upper limit potential of the positive electrode (vs. Li/Li$^+$) is set to range from about 4.0 V to 4.3 V. These gas generating agents have an oxidation potential (vs. Li/Li$^+$) of about 4.5 V to 4.6 V. Specifically, these gas generating agents have an oxidation potential higher by about 0.2 V to 0.6 V than the charging upper limit potential of the positive electrode, and, accordingly, can generate a gas (typically, hydrogen gas) promptly by undergoing rapid oxidative decomposition, in the positive electrode, at an early stage of overcharge. These compounds form readily conjugated systems and exchange electrons easily, and exhibit accordingly good reactivity (are oxidatively polymerizable). Therefore, the current interrupt device can be activated quickly and accurately, and the reliability of the battery during overcharge can be enhanced yet further.

The concentration of the gas generating agent in the nonaqueous electrolyte solution is not particularly limited, but is appropriately about 0.1% by mass or higher, and preferably 0.5% by mass or higher, with respect to 100% by mass of the nonaqueous electrolyte solution, from the viewpoint of securing a sufficient amount of gas for activating the overcharge prevention mechanism. The gas generating agent, however, can give rise to resistance components in cell reactions, and hence a concern of reduced input-output characteristic arises in a case where an excessive amount of gas generating agent is added. From that point of view, a suitable addition amount of gas generating agent is about 5% by mass or less, and is preferably set to 4% by mass or less. Ordinarily, setting a range of 0.1% by mass to 5% by mass is appropriate; preferably, the addition amount range is for instance set to 0.1% by mass to 4% by mass (preferably, 0.5% by mass to 3% by mass, in particular 0.5% by mass to 2% by mass).

The nonaqueous electrolyte solution can contain components other than the supporting salt, gas generating agent and nonaqueous solvent described above, so long as the effect of the present invention is not significantly impaired thereby. Any such component can be used for one, two or more purposes from among increasing the gas generation amount during overcharge, enhancing output performance and storability (for instance, suppressing drops in capacity during storage), enhancing the cycle characteristic, and enhancing the initial charge and discharge efficiency of the battery. Examples of such components include various additives, for instance film-forming agents such as lithium bisoxalate borate (LiBOB), vinylene carbonate (VC), vinyl ethylene carbonate (VEC) or the like, dispersants such as carboxymethyl cellulose (CMC) or the like, and thickeners.

Various examples pertaining to the present invention will be explained below, but the present invention is not meant to be limited to or by the matter illustrated in the specific examples.

As positive electrode active materials, firstly nine types of lithium transition metal complex oxide were prepared that had different composition and/or properties, as given in Table 1. The results of SEM observation performed on the positive electrode active materials revealed that all positive electrode active materials in Example 1 to Example 9 had a pierced hollow structure.

Figure 5:
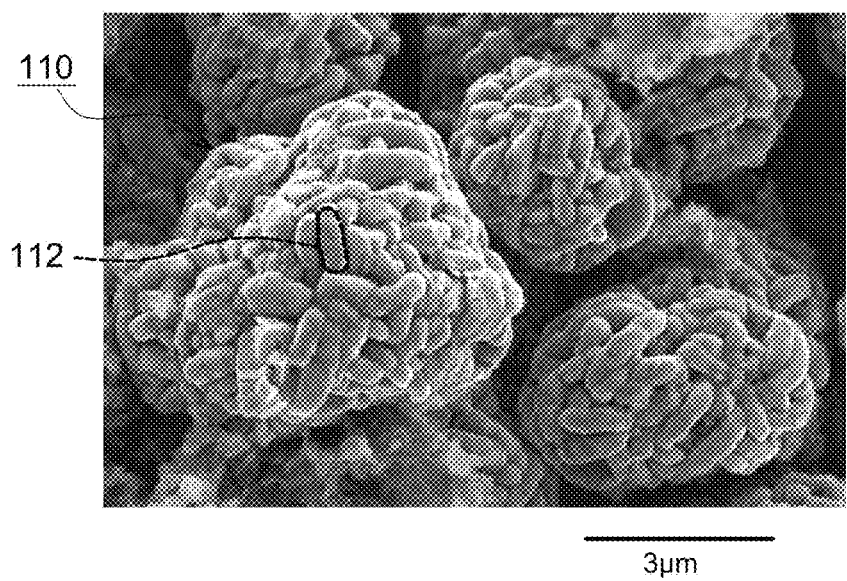
FIG. 5 is a SEM observation image of a positive electrode active material according to one embodiment.
Figure 6:
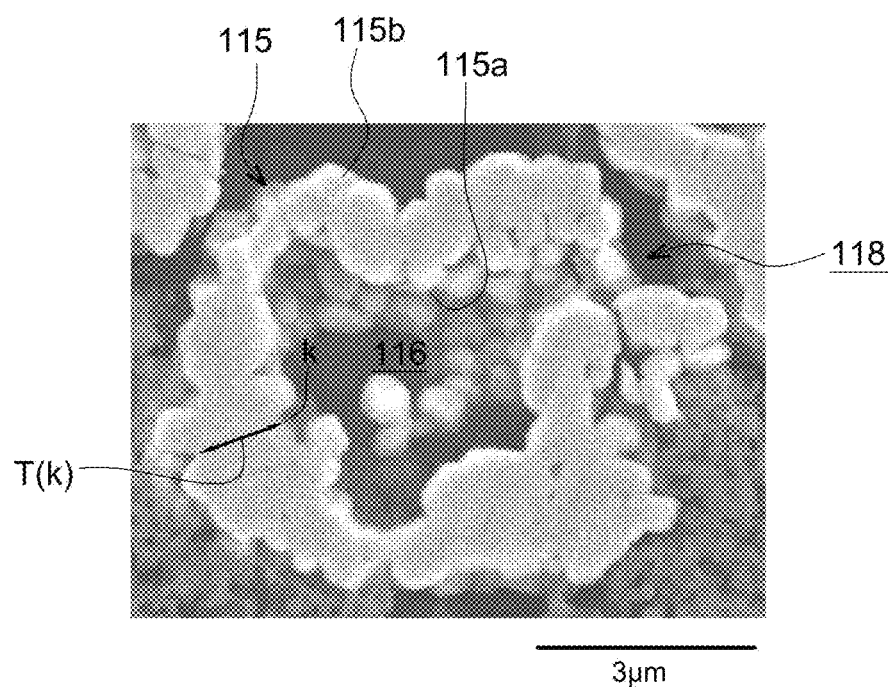
FIG. 6 is a cross-sectional SEM observation image of a positive electrode active material according to one embodiment.

As an example, FIG. 5 and FIG. 6 illustrate SEM observation images of a positive electrode active material according to Example 1. FIG. 5 is a SEM observation image of the resulting positive electrode active material particles, and FIG. 6 is a cross-sectional SEM observation image of a cross section cut through embedding and grinding of the positive electrode active material particles. The positive electrode active material particles prepared herein had the form of secondary particles 110 resulting from aggregation of primary particles 112, and comprised a distinct shell section 115 and hollow section 116. As illustrated in FIG. 6, it was observed that an average of one or more through-holes 118 per particle were formed in the shell section 115, with dense sintering of the shell section at portions other than the through-holes. Such observation, performed at ten arbitrary sites, revealed that the proportion (particle porosity of cross-sectional area ratio) of the hollow section 116 was about 23%, the thickness of the shell section 115 (average value of the shortest distance T(k) from any position k on the inner surface 115a of the shell section 115 up to the outer surface 115b of the shell section 115) was about 1.2 µm, and the major axis L1 of the primary particles 112 was 0.7 µm. Measurements of the hardness and half width ratio (A/B) of the resulting particles, performed in accordance with the methods already described above, yielded an average hardness in the range 0.5 MPa to 100 MPa, and a half width ratio (A/B) in the range 0.4 to 0.7.

thick (negative electrode collector) were coated by roller coating, to a basis weight of 14 mg/cm² (solids basis), with respective bands of the slurry, followed by drying (drying temperature 100° C., for 5 minutes), to produce a negative electrode sheet in which a negative electrode active material layer was provided on both faces of the negative electrode collector. The negative electrode sheet was rolled in a roll press, to adjust the thickness of the sheet to 100 µm and the electrode density to 1.4 g/cm³.

TABLE 1

| | Average composition | $D_{50}$ (µm) | $(D_{90} - D_{10})/D_{50}$ | Tap density(g/cm³) | Crystallite size (Å) |
|---|---|---|---|---|---|
| Example 1 | $Li_{1.14}Ni_{0.34}Co_{0.33}Mn_{0.33}Ca_{0.0002}O_2$ | 5.7 | 0.42 | 1.88 | 1073 |
| Example 2 | $Li_{1.14}Ni_{0.34}Co_{0.33}Mn_{0.33}Ca_{0.0002}O_2$ | 6.1 | 0.44 | 1.82 | 980 |
| Example 3 | $Li_{1.14}Ni_{0.34}Co_{0.33}Mn_{0.33}Ca_{0.0001}O_2$ | 5.7 | 0.42 | 1.82 | 1060 |
| Example 4 | $Li_{1.14}Ni_{0.34}Co_{0.33}Mn_{0.33}Ca_{0.0002}O_2$ | 8.1 | 0.56 | 1.91 | 903 |
| Example 5 | $Li_{1.14}Ni_{0.34}Co_{0.33}Mn_{0.33}Ca_{0.0002}O_2$ | 8 | 0.55 | 2.41 | 860 |
| Example 6 | $Li_{1.14}Ni_{0.34}Co_{0.33}Mn_{0.33}Ca_{0.0001}O_2$ | 5.74 | 0.42 | 1.8 | 1050 |
| Example 7 | $Li_{1.14}Ni_{0.34}Co_{0.33}Mn_{0.33}Ca_{0.0002}O_2$ | 4 | 0.39 | 1.6 | 1210 |
| Example 8 | $Li_{1.14}Ni_{0.34}Co_{0.33}Mn_{0.33}Ca_{0.0003}O_2$ | 5.7 | 0.42 | 1.82 | 980 |
| Example 9 | $Li_{1.14}Ni_{0.34}Co_{0.33}Mn_{0.33}Ca_{0.0002}O_2$ | 9 | 0.69 | 2.55 | 920 |

A laminate sheet-type cell (lithium secondary battery) was constructed using each of the positive electrode active material particles according to Example 1 to Example 9, and the characteristics of each cell was evaluated.

The positive electrode active material particles (LNCMC) given in Table 1, acetylene black (AB) as a conductive material, and polyvinylidene fluoride (PVdF) as a binder were charged in a kneader, to a mass ratio of LNCMC:AB:PVdF=90:8:2 of the foregoing materials, and the whole was kneaded, while under adjustment of the viscosity with N-methyl pyrrolidone (NMP), to a solids concentration of 50% by mass, to prepare respective positive electrode active material slurries. Both faces of an elongate sheet-like aluminum foil about 15 µm thick (positive electrode collector) were coated by roller coating, to a basis weight of 20 mg/cm² (solids basis), with respective bands of each slurry, followed by drying (drying temperature 80° C., for 5 minutes), to produce thereby a respective positive electrode sheet (Example 1 to Example 9) in which a positive electrode active material layer was provided on both faces of the positive electrode collector. The positive electrode sheets were rolled in a roll press, to adjust the thickness of the sheets to 130 µm and the electrode density to 2.8 g/cm³.

A negative electrode active material (natural graphite: C, average particle size 5 µm), styrene butadiene rubber (SBR) as a binder, and carboxymethyl cellulose (CMC) as a thickener, were charged in a kneader to a mass ratio of C:SBR:CMC=98:1:1 of the foregoing materials. The whole was kneaded, while under adjustment of the viscosity with deionized water, to a solids concentration of 45% by mass, to prepare a negative electrode active material slurry. Both faces of an elongate sheet-like elongate copper foil 10 µm Each positive electrode sheet and the negative electrode sheet thus produced were arranged opposing each other across a separator (the separator used herein had a three-layer structure (total thickness 20 µm, porosity 48 vol %) of polypropylene (PP) overlaid on both faces of polyethylene (PE), and provided, at the surface, with a porous heat-resistant layer having alumina as an main constituent), to produce a respective stacked electrode assembly. A positive electrode terminal and a negative electrode terminal were respectively attached to the positive electrode collector (uncoated section of the positive electrode active material layer) and the negative electrode collector (uncoated section of the negative electrode active material layer), exposed at the ends of each electrode assembly. The electrode assembly was accommodated inside a laminate film, and the whole was dried under reduced pressure and high temperature, to remove moisture. Thereafter, a nonaqueous electrolyte solution (the nonaqueous electrolyte solution used herein was obtained by dissolving $LiPF_6$ as a supporting salt, to a concentration of 1.1 mol/L, in a mixed solvent of ethylene carbonate (EC), dimethyl carbonate (DMC) and ethyl methyl carbonate (EMC) at a volume ratio of EC:DMC:EMC=3:4:3, and by further dissolving a gas generating agent (biphenyl), at a concentration of 2% by weight) was injected through the opening of the laminate film, and the opening was sealed. The lithium secondary batteries of Example 1 to Example 9, in which only the positive electrode active material varied, were thus constructed.

TABLE 2

| | Positive electrode active material particles. | | | Evaluation results | | |
|---|---|---|---|---|---|---|
| | Ca addition ratio | $D_{50}$ (µm) | Tap density (g/cm³) | Gas generation amount (relative value) | Initial capacity (mAh/g) | Positive electrode resistance (mΩ) |
| Example 1 | 0.0002 | 5.7 | 1.88 | 100 | 159 | 3.3 |
| Example 2 | 0.002 | 6.1 | 1.82 | 167 | 150.5 | 2.3 |
| Example 3 | 0.001 | 5.7 | 1.82 | 147 | 154.5 | 3.1 |
| Example 4 | 0.0002 | 8.1 | 1.91 | 113 | 160.2 | 2.9 |
| Example 5 | 0.0002 | 8 | 2.41 | 167 | 153.7 | 3.9 |

TABLE 2-continued

| | Positive electrode active material particles. | | | Evaluation results | | |
|---|---|---|---|---|---|---|
| | Ca addition ratio | $D_{50}$ (μm) | Tap density (g/cm³) | Gas generation amount (relative value) | Initial capacity (mAh/g) | Positive electrode resistance (mΩ) |
| Example 6 | 0.0001 | 5.74 | 1.8 | 87 | 159.6 | 3.2 |
| Example 7 | 0.0002 | 4 | 1.6 | 80 | 159.2 | 2.5 |
| Example 8 | 0.003 | 5.7 | 1.82 | 173 | 145.1 | 3.3 |
| Example 9 | 0.0002 | 9 | 2.55 | 180 | 158.3 | 4.9 |

<Conditioning>

The constructed batteries were subjected to conditioning. Herein 3 cycles of charge and discharge were performed, each cycle involving (1) through (4) below.

(1) Constant current charging (CC charging) to 4.1 V at a rate of 1 C (50 mA).
(2) Pause of five minutes.
(3) Constant current discharge (CC discharge) to 3.0 V at a rate of 1 C (50 mA).
(4) Pause of five minutes.

<Measurement of Rated Capacity (Initial Capacity)>

Each battery after conditioning was charged and discharged over a voltage range from 3.0 V to 4.2 V, according to (1) to (4) below, in a temperature environment at 25° C., and initial capacity was checked.

(1) The battery was charged at constant current (CC charging) at a rate of 1 C (50 mA), until the battery voltage reached 4.2 V; thereafter, the battery was charged at constant voltage (CV charging), until the current reached a rate of 0.01 C (0.5 mA).
(2) Pause of 1 hour.
(3) The battery was CC-discharged at a rate of 1 C (50 mA) until the battery voltage reached 3.0 V; thereafter, the battery was discharged at constant voltage (CV discharge) until the current reached a rate of 0.01 C (0.5 mA).
(4) Pause of 5 minutes.

Figure 7:
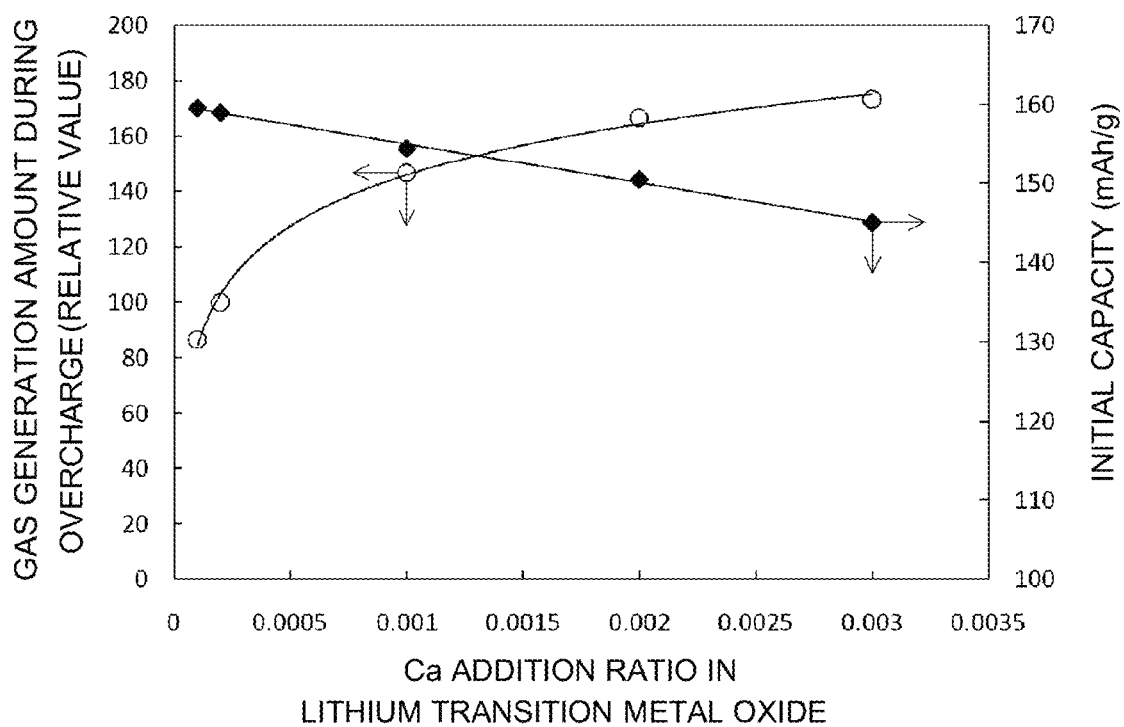
FIG. 7 is a graph illustrating a correlation of battery characteristics and Ca addition ratio in a lithium transition metal oxide.

The resulting discharge capacity (sum of the products of current values and voltage values) was taken as the rated capacity (initial capacity). The results are set out in the column "Initial capacity" of Table 2. FIG. 7 illustrates a relationship between the Ca addition ratio of the positive electrode active material and the initial capacity of batteries in Example 1 to Example 3, Example 6 and Example 8, in which tap density is roughly equivalent to 1.8 to 1.9.

As FIG. 7 reveals, a trend is observed whereby initial capacity, i.e. the energy density of the battery, decreases as the Ca addition ratio increases. For instance, an energy density of 150 mAh/g or higher can be realized in batteries that require high energy density, such as those batteries that are used in, for instance, power sources for driving a vehicle. From the above point of view, it was found that the Ca addition ratio (denoted by β in Formula (I) above) of the positive electrode active material was typically 0.0025 or lower, for instance lower than 0.0025, preferably 0.002 or lower, and particularly preferably lower than 0.002.

<Measurement of the Resistance of the Positive Electrode>

Figure 8:
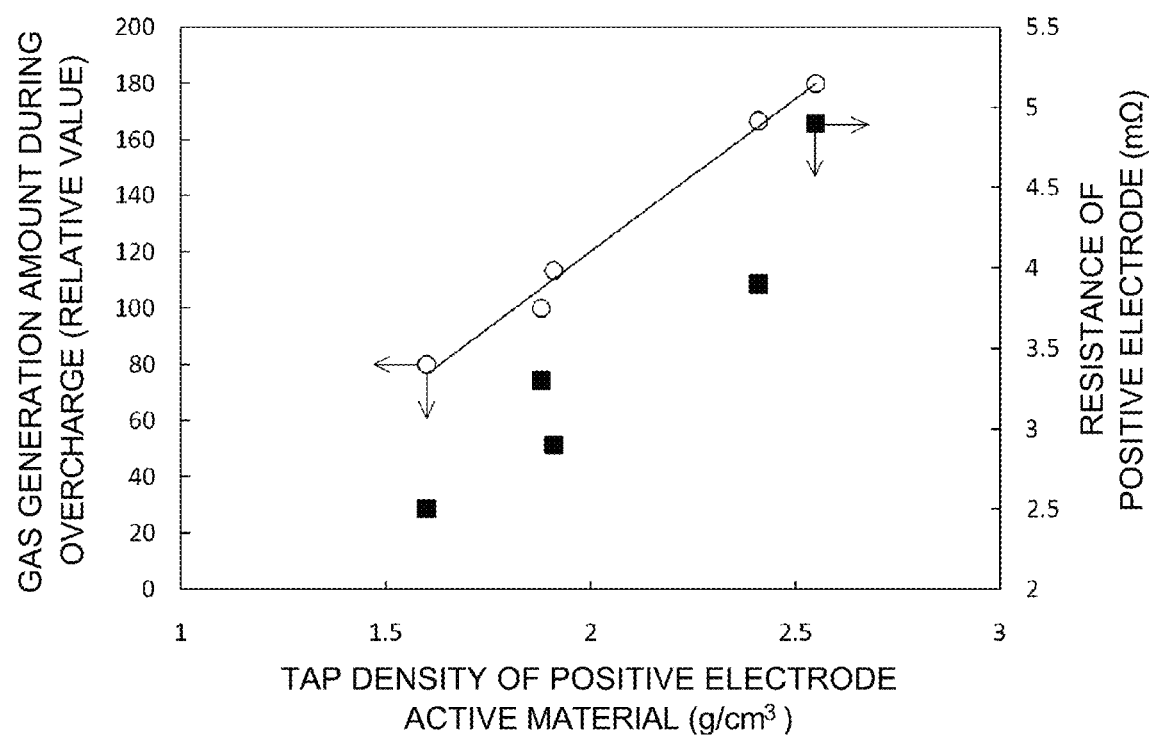
FIG. 8 is a graph illustrating a correlation between tap density and characteristics of a positive electrode active material.

The resistance of the positive electrode was measured next in a 25° C. temperature environment. Specifically, the battery was firstly charged at constant current 1 C (50 mA) until the voltage across terminals of the positive and negative electrodes was 4.1 V. Thereafter, the battery was charged at constant voltage for 3 hours, to adjust the battery to a fully charged state. The resistance of the positive electrode was measured in accordance with an AC impedance measurement method, under the conditions below. An equivalent circuit was fitted to a resulting Cole-Cole plot (also referred to as Nyquist plot), to work out the resistance (mΩ) of the positive electrode. The results are given in the column "Battery resistance (mΩ)" of Table 2. FIG. 8 illustrates a relationship between battery resistance and the tap density of the positive electrode active material, for the batteries of Example 1, Example 4, Example 5, Example 7 and Example 9, having the same Ca addition ratio of 0.0002.

As FIG. 8 reveals, a trend was observed wherein the higher the tap density of the positive electrode active material, the higher the resistance of the positive electrode is. Preferably, the resistance of the positive electrode is 4 mΩ or smaller in batteries that require a high energy density or high output density, such as those that are utilized, for instance, in power sources for driving a vehicle. From the above point of view, it was found that the tap density of the positive electrode active material is lower than 2.55, typically 2.5 or lower, for instance lower than 2.5, preferably 2.45 or lower, and particularly preferably lower than 2.45.

<Overcharge Test>

Gas generation amounts were measured next in a 25° C. temperature environment. Specifically, the thickness of each battery prior to an overcharge test (i.e. the thickness in the stacking direction of the electrode assembly) was measured first using a rotary caliper. Thereafter, the battery was CC-charged at 1 C (50 mA) until the voltage across terminals in the positive and negative electrodes reached 4.1 V. Thereafter, the battery was CV-charged for 3 hours, to adjust the battery to a fully charged state. The battery in this fully charged state was further CC-charged at 2 C (100 mA) until the integrated current reached 150 mA (i.e. overcharge state). The thickness of the battery in the overcharge state was measured. The increment in thickness derived from generation of gas during overcharge was calculated by subtracting the thickness of the battery (cm) before the overcharge test from the thickness (cm) of the battery in the overcharge state. The obtained result was divided by a thickness corresponding to the amount of gas necessary for activating the CID, and the result was multiplied by 100, to calculate a relative value. The results are given in the column "Gas generation amount" of Table 2. The larger this value, the greater is the gas generation amount during overcharge as denoted by the value. FIG. 7 illustrates the relationship between gas generation amount and Ca addition ratio, and FIG. 8 illustrates the relationship between gas generation amount and tap density.

As FIG. 7 reveals, a trend was observed wherein the gas generation amount during overcharge increases as the Ca addition ratio becomes greater. This can be ascribed to the enhanced reactivity during overcharge that results from incorporating Ca as a structural element. It was found therefore that the Ca addition ratio of the positive electrode active material (β in Formula (I) above) is typically 0.0002 or higher, and preferably higher than 0.0002, from the viewpoint of reliability during overcharge. A desired amount of gas can be stably obtained during overcharge when the above value of 13 is satisfied.

Accordingly, it was found that value of β in Formula (I) above is typically $0.0002 \leq \beta \leq 0.0025$, for instance $0.0002 \leq \beta < 0.0025$, preferably $0.0002 \leq \beta \leq 0.002$, and particularly preferably $0.0002 \leq \beta < 0.002$, from the viewpoint of achieving, at a yet higher level, both battery performance (for instance, energy density, input-output density) and reliability during overcharge. These results bear out the technical significance of the present invention.

As FIG. 8 further reveals, a trend was found wherein the higher the tap density of the positive electrode active material, the greater is the gas generation amount during overcharge. This arises conceivably from the fact that discharge paths for the gas generated during overcharge can be secured through an increase in the tap density, whereby the gas can be discharged quickly out of the electrode assembly. Therefore, it was found that the tap density of the positive electrode active material is 1.8 or higher, typically 1.85 or higher, for instance higher than 1.85, preferably 1.88 or higher, and particularly preferably higher than 1.88, from the viewpoint of reliability during overcharge.

It was accordingly found that the tap density of the positive electrode active material is typically in the range 1.8 to 2.55, for instance in the range 1.8 to 2.5, preferably in the range 1.85 to 2.5, and particularly preferably in the range 1.88 to 2.45, from the viewpoint of combining, at a yet higher level, battery performance (for instance, energy density and input-output density) with reliability during overcharge. Such results bear out the effect of the present invention.

The present invention has been explained in detail above, but the above embodiments are merely illustrative, and the invention disclosed herein includes all manner of variations and modifications of the specific examples described above.

INDUSTRIAL APPLICABILITY

By virtue of the excellent performance exhibited by the lithium secondary battery provided in accordance with the technology disclosed herein, the lithium secondary battery can be used as a lithium secondary battery for various applications. Among such applications, the lithium secondary battery can be suitably used as a power source for motors (electric motors) that are installed in vehicles such as automobiles. Such a lithium secondary battery may be used in the form of an assembled battery resulting from connecting in series and/or in parallel a plurality of such lithium secondary batteries. Therefore, the technology disclosed herein allows providing a vehicle (typically, an automobile, in particular an automobile that is provided with an electric motor, for instance a hybrid automobile, a plug-in hybrid automobile, an electric automobile, a fuel cell automobile, an electric scooter, a power-assisted bicycle, an electric wheelchair, an electric railway and the like) that comprises such a lithium secondary battery (which may be in the form of an assembled battery), as a power source.

REFERENCE SIGNS LIST 10 positive electrode sheet (positive electrode)
12 positive electrode collector
14 positive electrode active material layer
20 negative electrode sheet (negative electrode)
22 negative electrode collector
24 negative electrode active material layer
30 current interrupt device (CID)
32 deformation metal plate (conduction member; first member)
33 curved portion
34 connection metal plate (conduction member; second member)
35 collecting lead terminal
36 junction
38 insulating case
40 separator sheet (separator)
50 battery case
52 battery case main body
54 lid body
55 safety valve
70 positive electrode terminal
72 negative electrode terminal
74 positive electrode collector plate
76 negative electrode collector plate
80 wound electrode assembly
100 lithium secondary battery
110 positive electrode active material particles (positive electrode active material)
112 primary particle
115 shell section
115a inner surface of shell section
115b outer surface of shell section
116 hollow section
118 through-hole

The invention claimed is:

1. A particulate positive electrode active material that is used in a lithium secondary battery, comprising:
a lithium transition metal oxide of a layered crystal structure, comprising Ni, Co, Mn and Ca as structural elements and being represented by the following formula (I):

$$Li_{1+\alpha}Ni_xCo_yMn_zCa_\beta O_2 \tag{I}$$

wherein, in formula (I), $-0.05 \leq \alpha \leq 0.2$, $x+y+z+\beta \approx 1$, $0.3 \leq x \leq 0.7$, $0.1 \leq y \leq 0.4$, $0.1 \leq z \leq 0.4$, and $0.001 \leq \beta \leq 0.002$, wherein
Ca is a substitutional element in the crystal structure of the lithium transition metal oxide,
the tap density of the positive electrode active material ranges from 1.8 g/cm³ to 2.5 g/cm³, and
in a volume-basis particle size distribution measured on the basis of a laser diffraction/light scattering method:
an average particle size $D_{50}$ corresponding to a cumulative 50% from the fine particle side of the particle size distribution ranges from 5 μm to 9 μm, and
a particle size $D_{10}$ corresponding to a cumulative 10% from the fine particle side of the particle size distribution, a particle size $D_{90}$ corresponding to a cumulative 90% from the fine particle side of the particle size distribution, and said average particle size $D_{50}$ satisfy the following relationship: $(D_{90}-D_{10})/D_{50} \leq 0.7$.

2. The positive electrode active material according to claim 1,
wherein said positive electrode active material is a hollow structure having a shell section made up of the lithium transition metal oxide of the layered crystal structure, and a hollow section formed inside the shell section, and the thickness of said shell section, on the basis of an electron microscope observation, ranges from 0.1 µm to 2 µm.

3. The positive electrode active material according to claim 2, wherein said positive electrode active material has a through-hole that runs through said shell section.

4. The positive electrode active material according to claim 1, wherein a crystallite size r of said positive electrode active material, based on X-ray diffraction, ranges from 0.05 µm to 0.2 µm.

5. A lithium secondary battery in which an electrode assembly including a positive electrode and a negative electrode, and an nonaqueous electrolyte solution, are accommodated inside a battery case, wherein said battery case has a current interrupt device that is activated when an internal pressure of the battery case rises; and said positive electrode has the positive electrode active material according to claim 1.

* * * * *